(12) United States Patent
Sato et al.

(10) Patent No.: US 6,922,316 B2
(45) Date of Patent: Jul. 26, 2005

(54) THIN-FILM MAGNETIC HEAD AND METHOD OF MANUFACTURING SAME

(75) Inventors: Yoshikazu Sato, Tokyo (JP); Yuichi Watabe, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 600 days.

(21) Appl. No.: 09/985,608

(22) Filed: Nov. 5, 2001

(65) Prior Publication Data

US 2002/0075595 A1 Jun. 20, 2002

(30) Foreign Application Priority Data

Nov. 10, 2000 (JP) ........................................ 2000-344507

(51) Int. Cl.$^7$ ................................................. G11B 5/39
(52) U.S. Cl. ...................................... 360/317; 360/126
(58) Field of Search .............................. 360/317, 126; 29/603.14

(56) References Cited

U.S. PATENT DOCUMENTS

| | | | | |
|---|---|---|---|---|
| 6,154,345 A | * | 11/2000 | Ishiwata et al. | 360/317 |
| 6,317,288 B1 | * | 11/2001 | Sasaki | 360/126 |
| 6,477,005 B1 | * | 11/2002 | Sasaki | 360/126 |
| 6,612,017 B2 | * | 9/2003 | Santini | 29/603.12 |
| 6,668,442 B2 | * | 12/2003 | Sasaki | 29/603.14 |
| 6,738,232 B1 | * | 5/2004 | Sasaki | 360/317 |
| 6,747,851 B2 | * | 6/2004 | Sasaki et al. | 360/317 |
| 2003/0128480 A1 | * | 7/2003 | Saitho et al. | 360/317 |

FOREIGN PATENT DOCUMENTS

| | | |
|---|---|---|
| JP | A 11-102506 | 4/1999 |
| JP | A 2000-57522 | 2/2000 |
| JP | A 2000-067413 | 3/2000 |

OTHER PUBLICATIONS

"Nikkei Electronics", Sep. 25, 2000 Issue (No. 779), p. 206, FIG. 2.
"Head/Media Las Vegas 2000—Show Directory" Nov. 11–12, 2000.

* cited by examiner

Primary Examiner—A. J. Heinz
Assistant Examiner—Mark Blouin
(74) Attorney, Agent, or Firm—Oliff & Berridge, PLC

(57) ABSTRACT

A thin-film magnetic head comprises: a first magnetic layer and a second magnetic layer each of which includes a magnetic pole portion, the first and second magnetic layers being magnetically coupled to each other at a distance from the medium facing surface ABS; a gap layer provided between the first and second magnetic layers; and a thin-film coil at least a part of which is disposed between the first and second magnetic layers. The second magnetic layer has a pole portion layer and a yoke portion layer. The pole portion layer has a saturated magnetic flux density equal to or greater than that of the yoke portion layer. The yoke portion layer includes: a first layer and a second layer, of which the first layer is in contact with the first magnetic layer and a surface of the pole portion layer that is closer to the gap layer; and the second layer is in contact with the first layer, the rear end surface of the pole portion layer and both side surfaces of the pole portion layer in the width direction.

54 Claims, 24 Drawing Sheets

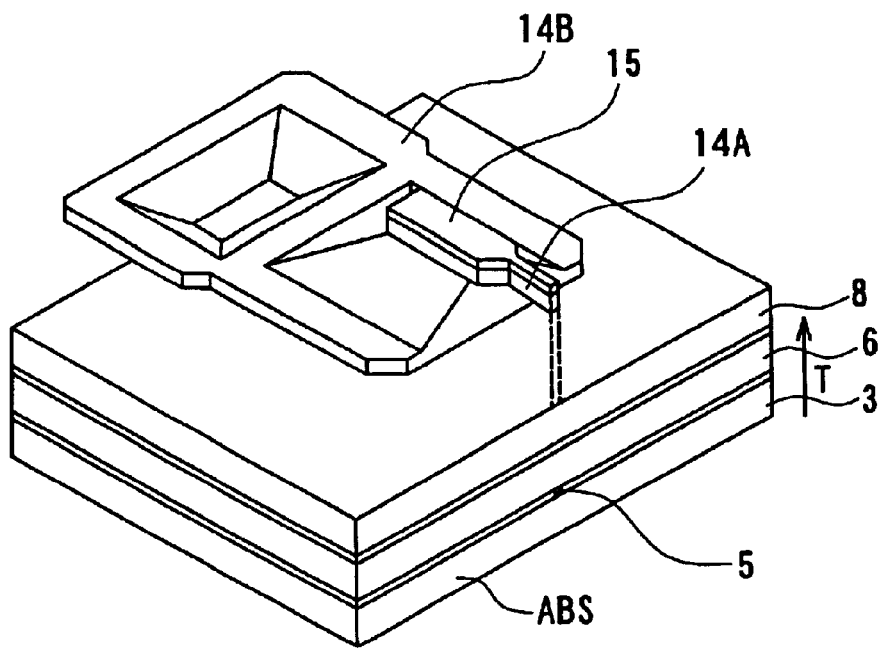
F I G. 40
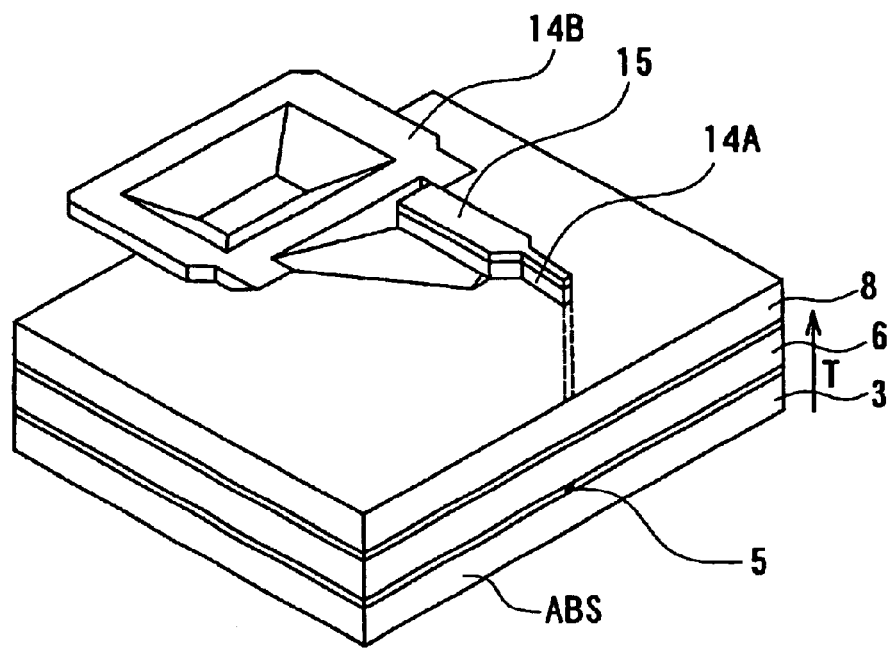
F I G. 41

THIN-FILM MAGNETIC HEAD AND METHOD OF MANUFACTURING SAME

BACKGROUND OF THE INVENTION

1. Field of the Invention

The present invention relates to a thin-film magnetic head for use with a magnetic read/write apparatus such as a magnetic disc apparatus and a magnetic tape apparatus, and to the method of manufacturing such a thin-film magnetic head.

2. Description of the Related Art

The recording schemes for a magnetic read/write apparatus include a longitudinal magnetic recording scheme which employs the direction of signal magnetization along the surface of the recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first magnetic layer and a second magnetic layer magnetically coupled to each other and including magnetic pole portions that are opposed to each other and placed in regions of the magnetic layers on a side of the medium facing surface, with a gap layer provided between the pole portions; and a thin-film coil at least a part of which is placed between the first and second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the recording medium with one main magnetic pole. Generally, for the single magnetic pole head, used as a recording medium is a two-layer medium that has a soft magnetic layer and a magnetic recording layer stacked on a substrate.

For thin-film magnetic heads, it is desired that the track width should be reduced so as to increase track density. For the purpose of achieving reduction in the track width without reducing the intensity of a magnetic field to be applied to the recording medium, various thin-film magnetic heads have been proposed, in which the magnetic layer including the magnetic pole portion is divided into a magnetic pole portion and a yoke portion that is magnetically connected to the magnetic pole portion, the magnetic pole portion having a saturated magnetic flux density higher than that of the yoke portion.

Examples of the thin-film magnetic head having the structure in which the magnetic layer including the magnetic pole portion is divided into the magnetic pole portion and the yoke portion as mentioned above are disclosed in Published Unexamined Japanese Patent Application (KOKAI) Nos. 2000-57522, 2000-67413, and Heisei 11-102506.

Any one of the thin-film magnetic heads disclosed in the aforementioned publications comprises the first and second magnetic layers. The second magnetic layer is disposed on the leading side in the traveling direction of the recording medium (or on the air-outflow-end side of a slider including the thin-film magnetic head), and is divided into the magnetic pole portion and the yoke portion.

In addition, in any one of the thin-film magnetic heads disclosed in the aforementioned publications, the yoke portion is arranged so as to detour around a coil in a region extending from a portion where the first and second magnetic layers are magnetically connected to each other to the magnetic pole portion.

In the thin-film magnetic head disclosed in Published Unexamined Japanese Patent Application (KOKAI) No. 2000-57522, the second magnetic layer has a main magnetic film and an auxiliary magnetic film. In this head, the magnetic pole portion is composed of a part of the main magnetic film located on a side of the medium facing surface, while the yoke portion is composed of the other part of the main magnetic film and the auxiliary magnetic film.

In the thin-film magnetic head disclosed in Published Unexamined Japanese Patent Application (KOKAI) No. 2000-67413, the second magnetic layer has a pole portion layer including the magnetic pole portion, and a yoke portion layer including the yoke portion. The pole portion layer is magnetically connected to the yoke portion layer at the rear end surface (opposite to the medium facing surface), at the side surfaces (perpendicular to the medium facing surface and a surface of the gap portion), and at the top surface (opposite to the gap portion).

In the thin-film magnetic head disclosed in Published Unexamined Japanese Patent Application (KOKAI) No. Heisei 11-102506, the second magnetic layer has a pole portion layer including the magnetic pole portion, and a yoke portion layer including the yoke portion. The pole portion layer is magnetically connected to the yoke portion layer at the side surfaces and at the top surface.

On the other hand, for the thin-film magnetic head employing the vertical magnetic recording scheme, an example of the structure of a single magnetic pole head is shown in FIG. 2 of "Nikkei Electronics, Sep. 25, 2000 Issue (No.779), p.206". This head has a single-layered magnetic layer including the main magnetic pole.

For example, to realize a magnetic read/write apparatus having an areal recording density of 60G bits/inch$^2$ or greater, the vertical magnetic recording scheme is expected to be employable. However, such a thin-film magnetic head has not been realized that is suitable for the vertical magnetic recording scheme and has characteristics capable of realizing a magnetic read/write apparatus having an areal recording density of 60G bits/inch$^2$ or greater. This is because of problems as discussed below that are present in the prior-art thin-film magnetic heads.

First, any one of the thin-film magnetic heads disclosed in the aforementioned publications is intended structurally for the longitudinal magnetic recording scheme and not suitable for the vertical magnetic recording scheme. More specifically, any one of the thin-film magnetic heads disclosed in the aforementioned publications has a thin gap portion and a short throat height, and the yoke portion is arranged to detour around the coil. This structure raises a problem that the magnetic pole portion develops a reduced magnetic field that is perpendicular to the surface of the recording medium. Furthermore, any one of the thin-film magnetic heads disclosed in the aforementioned publications is vulnerable to curving at the edge opposite to the gap portion of the magnetic pole portion, due to the etching for patterning the magnetic pole portion of the second magnetic layer or the steps subsequent to the formation of the magnetic pole portion. This raises a problem that a distortion occurs in the shape of the bit pattern of the recording medium, which makes it difficult to increase the linear recording density. Furthermore, any one of the thin-film magnetic heads disclosed in the aforementioned publications has a structure in which the yoke portion is arranged so as to detour around the coil, which raises a problem of having a long magnetic path, and this in turn causes a deterioration of the high-frequency characteristics.

On the other hand, in the thin-film magnetic head disclosed in Published Unexamined Japanese Patent Application (KOKAI) No. Heisei 11-102506, the pole portion layer is magnetically connected to the yoke portion layer only at the side surfaces and the top surface. This structure causes the head to have a small area of the connecting portion where the pole portion layer and the yoke portion layer are magnetically connected to each other. Accordingly, this raises a problem that the magnetic flux is saturated at the connecting portion, thereby causing the magnetic pole portion to generate a reduced magnetic field in the medium facing surface.

On the other hand, in the thin-film magnetic head shown in FIG. 2 of "Nikkei Electronics, Sep. 25, 2000 Issue (No. 779), p.206", the magnetic layer including the main magnetic pole is made up of a single layer. In this head, in order to reduce the thickness of the magnetic layer in the medium facing surface, the entire magnetic layer is made thin. Accordingly, this raises a problem that the magnetic flux tends to be saturated halfway through the magnetic layer and therefore the main magnetic pole generates a reduced magnetic field in the medium facing surface.

Moreover, in this head, the entire magnetic layer has to be made flat when considering the need to flatten the main magnetic pole. This causes the head to have a square and long magnetic path. Such a structure makes the head inefficient in terms of the intensity of magnetic field and high-frequency characteristics.

OBJECT AND SUMMARY OF THE INVENTION

It is therefore an object of the present invention to provide a thin-film magnetic head and a method of manufacturing same, which make it possible to increase the intensity of magnetic field generated from the magnetic pole portion in the direction perpendicular to the surface of the recording medium, and to reduce a magnetic path length to improve high-frequency characteristics.

A first thin-film magnetic head of the invention comprises:

a medium facing surface that faces toward a recording medium;

a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;

a gap layer made of a non-magnetic material and provided between the first and second magnetic layers; and a thin-film coil at least a part of which is disposed between the first and second magnetic layers and insulated from the first and second magnetic layers, wherein:

a surface of the at least part of the thin-film coil, the surface being closer to the second magnetic layer, is located closer to the first magnetic layer than an end of the gap layer is, the end being located in the medium facing surface next to the second magnetic layer;

the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other;

the pole portion layer has a saturated magnetic flux density equal to or greater than that of the yoke portion layer; and the yoke portion layer is magnetically connected to the pole portion layer at least at a surface of the pole portion layer that is closer to the gap layer, and both side surfaces of the pole portion layer in the width direction.

In the first thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and both side surfaces of the pole portion layer in the width direction. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer and at both side surfaces of the pole portion layer in the width direction, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the first thin-film magnetic head of the invention, the first magnetic layer may be disposed on a trailing side in the traveling direction of the recording medium, and the second magnetic layer may be disposed on a leading side in the traveling direction of the recording medium.

In the first thin-film magnetic head of the invention, the yoke portion layer may include: a first layer that is in contact with and magnetically connected to the first magnetic layer and the surface of the pole portion layer closer to the gap layer; and a second layer that is in contact with and magnetically connected to the first layer and both the side surfaces of the pole portion layer in the width direction. In this case, the second layer of the yoke portion layer may be further magnetically connected to a surface of the pole portion layer that is farther from the gap layer.

In the first thin-film magnetic head of the invention, the yoke portion layer may be magnetically connected to the pole portion layer further at an end surface of the pole portion layer that is farther from the medium facing surface. In this case, the yoke portion layer may include: a first layer that is in contact with and magnetically connected to the first magnetic layer and the surface of the pole portion layer that is closer to the gap layer; and a second layer that is in contact with and magnetically connected to the first layer, the end surface of the pole portion layer that is farther from the medium facing surface, and both the side surfaces of the pole portion layer in the width direction. In this case, the second layer of the yoke portion layer may be further magnetically connected to a surface of the pole portion layer that is farther from the gap layer.

In the first thin-film magnetic head of the invention, an end of the yoke portion layer that is closer to the medium facing surface may be disposed at a distance from the medium facing surface.

In the first thin-film magnetic head of the invention, a portion of the pole portion layer that is in contact with the yoke portion layer may have a width greater than the width of the pole portion layer measured in the medium facing surface.

In the first thin-film magnetic head of the invention, the end surface of the pole portion layer that is farther from the medium facing surface may be located at a distance of 2 $\mu$m or more from the medium facing surface.

The first thin-film magnetic head of the invention may further comprise a non-magnetic layer that is in contact with a surface of the pole portion layer that is farther from the gap layer. In this case, the non-magnetic layer may be exposed in the medium facing surface. Further, part of the yoke portion layer may be adjacent to the surface of the pole portion layer farther from the gap layer via the non-magnetic layer, and may be magnetically connected to the pole portion layer via the non-magnetic layer. Further, the non-magnetic layer may be made of a material having a lower etching rate for dry etching than that of a material forming the pole portion layer, and than that of a material forming a portion of the gap layer, the portion being in contact with the pole portion layer.

In the first thin-film magnetic head of the invention, the at least part of the thin-film coil may be located closer to the first magnetic layer than a midpoint between the first magnetic layer and the pole portion layer of the second magnetic layer.

In the first thin-film magnetic head of the invention, the gap layer may comprise: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface. In this case, the first portion may be made of an organic, non-conductive and non-magnetic material, or a spin-on-glass film. The second portion may be made of an inorganic, non-conductive and non-magnetic material.

The first thin-film magnetic head of the invention may further comprise a magnetoresistive element as a read element. In this case, the head may further comprise a first shield layer and a second shield layer for shielding the magnetoresistive element, the first and second shield layers having portions that are located on a side of the medium facing surface and opposed to each other, the magnetoresistive element being located between these portions. The first magnetic layer may also serve as the second shield layer.

The first thin-film magnetic head of the invention may be employed for a vertical magnetic recording scheme.

A first method of the invention is provided for manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein: the second magnetic layer has a pole portion layer including the magnetic pole portion, the width of the pole portion layer measured in the medium facing surface defining a track width, and a yoke portion layer for magnetically connecting the pole portion layer and the first magnetic layer to each other; and the pole portion layer has a saturated magnetic flux density equal to or greater than that of the yoke portion layer.

The method comprises the steps of:

forming the first magnetic layer; and forming the gap layer, the thin-film coil and the second magnetic layer on the first magnetic layer, such that a surface of the at least part of the thin-film coil, the surface being closer to the second magnetic layer, is located closer to the first magnetic layer than an end of the gap layer is, the end being located in the medium facing surface next to the second magnetic layer, and such that the yoke portion layer is magnetically connected to the pole portion layer at least at a surface of the pole portion layer that is closer to the gap layer, and both side surfaces of the pole portion layer in the width direction.

In the first method of manufacturing a thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and both side surfaces of the pole portion layer in the width direction. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer and at both side surfaces of the pole portion layer in the width direction, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the first method of manufacturing a thin-film magnetic head of the invention, the yoke portion layer may be magnetically connected to the pole portion layer further at an end surface of the pole portion layer that is farther from the medium facing surface.

In the first method of manufacturing a thin-film magnetic head of the invention, the yoke portion layer may include: a first layer that is in contact with and magnetically connected to the first magnetic layer and the surface of the pole portion layer that is closer to the gap layer; and a second layer that is in contact with and magnetically connected to the first layer and both the side surfaces of the pole portion layer in the width direction. Further, the step of forming the gap layer, the thin-film coil and the second magnetic layer may include the steps of:

forming the thin-film coil and one part of the gap layer on the first magnetic layer, the one part of the gap layer insulating the thin-film coil from its surrounding;

forming the first layer of the yoke portion layer on the first magnetic layer and the one part of the gap layer;

forming other part of the gap layer on the first magnetic layer, the one part of the gap layer and the first layer;

polishing the other part of the gap layer to expose the first layer and flattening top surfaces of the first layer and the other part of the gap layer;

forming a layer to be etched, the layer being made of a material for forming the pole portion layer, on the first layer and the other part of the gap layer that have been flattened;

etching the layer to be etched selectively by dry etching, thereby defining an outer shape of the pole portion layer that is in contact with the first layer and exposing the first layer; and forming the second layer of the yoke portion layer on the first layer.

In this case, the second layer of the yoke portion layer may further be in contact with and magnetically connected to an end surface of the pole portion layer that is farther from the medium facing surface. Also, the step of forming the gap layer, the thin-film coil and the second magnetic layer may further include, after the step of forming the layer to be etched, the step of flattening a top surface of the layer to be etched, by polishing.

Further, the step of forming the gap layer, the thin-film coil and the second magnetic layer may further include, after the step of forming the layer to be etched, the steps of: forming a non-magnetic layer on the layer to be etched; and forming a mask corresponding to the shape of the pole portion layer, on the non-magnetic layer, and, in the step of etching the layer to be etched, the non-magnetic layer and the layer to be etched may be etched through the use of the mask. In the step of forming the mask, a resist frame having a gap portion corresponding to the shape of the pole portion layer may be formed on the non-magnetic layer, and the mask may be formed inside the gap portion of the resist frame.

The second layer of the yoke portion layer may be formed by electroplating. In this case, the step of forming the second layer of the yoke portion layer may include the steps of: forming a resist cover for covering a part of the pole portion layer located near the medium facing surface; forming an electrode layer for electroplating on the resist cover, the pole portion layer and the first layer of the yoke portion layer; and forming the second layer of the yoke portion layer by electroplating using the electrode layer.

A second thin-film magnetic head of the invention comprises:

a medium facing surface that faces toward a recording medium;

a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;

a gap layer made of a non-magnetic material and provided between the first and second magnetic layers; and a thin-film coil at least a part of which is disposed between the first and second magnetic layers and insulated from the first and second magnetic layers, wherein:

a surface of the at least part of the thin-film coil, the surface being closer to the second magnetic layer, is located closer to the first magnetic layer than an end of the gap layer is, the end being located in the medium facing surface next to the second magnetic layer;

the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other;

the pole portion layer has a saturated magnetic flux density equal to or greater than that of the yoke portion layer;

the yoke portion layer is magnetically connected to the pole portion layer at least at a surface of the pole portion layer that is closer to the gap layer; and a portion where the yoke portion layer and the pole portion layer are connected to each other is located closer to the medium facing surface than a portion where the first magnetic layer and the yoke portion layer are connected to each other.

In the second thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and, a portion where the yoke portion layer and the pole portion layer are connected to each other is located closer to the medium facing surface than a portion where the first magnetic layer and the yoke portion layer are connected to each other. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the second thin-film magnetic head of the invention, of a surface of the yoke portion layer farther from the first magnetic layer, a portion that is not in contact with the pole portion layer may be located closer to the first magnetic layer than a surface of the pole portion layer closer to the gap layer.

In the second thin-film magnetic head of the invention, at least part of the surface of the yoke portion layer farther from the first magnetic layer may gradually approach the first magnetic layer as the distance from the pole portion layer increases.

In the second thin-film magnetic head of the invention, the first magnetic layer may be disposed on a trailing side in the traveling direction of the recording medium, and the second magnetic layer may be disposed on a leading side in the traveling direction of the recording medium.

In the second thin-film magnetic head of the invention, an end of the yoke portion layer that is closer to the medium facing surface may be disposed at a distance from the medium facing surface.

In the second thin-film magnetic head of the invention, a portion of the pole portion layer that is in contact with the yoke portion layer may have a width greater than the width of the pole portion layer measured in the medium facing surface.

In the second thin-film magnetic head of the invention, an end surface of the pole portion layer that is farther from the medium facing surface may be located at a distance ice of 2 $\mu$m or more from the medium facing surface.

The second thin-film magnetic head of the invention may further comprise a non-magnetic layer that is in contact with a surface of the pole portion layer that is farther from the gap layer. In this case, the non-magnetic layer may be exposed in the medium facing surface. Further, the non-magnetic layer may be made of a material having a lower etching rate for dry etching than that of a material forming the pole portion layer, and than that of a material forming a portion of the gap layer, the portion being in contact with the pole portion layer.

In the second thin-film magnetic head of the invention, the at least part of the thin-film coil may be located closer to the first magnetic layer than a midpoint between the first magnetic layer and the pole portion layer of the second magnetic layer.

In the second thin-film magnetic head of the invention, the gap layer may comprise: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface. In this case, the first portion may be made of an organic, non-conductive and non-magnetic material, or a spin-on-glass film. The second portion may be made of an inorganic, non-conductive and non-magnetic material.

The second thin-film magnetic head of the invention may further comprise a magnetoresistive element as a read element. In this case, the head may further comprise a first shield layer and a second shield layer for shielding the magnetoresistive element, the first and second shield layers having portions that are located on a side of the medium facing surface and opposed to each other, the magnetoresistive element being located between these portions. Further, the first magnetic layer may also serve as the second shield layer.

The second thin-film magnetic head of the invention may be employed for a vertical magnetic recording scheme.

A second method of the invention is provided for manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein: the second magnetic layer has a pole portion layer including the magnetic pole portion, the width of the pole portion layer measured in the medium facing surface defining a track width, and a yoke portion layer for magnetically connecting the pole portion layer and the first magnetic layer to each other; and the pole portion layer has a saturated magnetic flux density equal to or greater than that of the yoke portion layer.

The method comprises the steps of:

forming the first magnetic layer; and forming the gap layer, the thin-film coil and the second magnetic layer on the first magnetic layer, such that a surface of the at least part of the thin-film coil, the surface being closer to the second magnetic layer, is located closer to the first magnetic layer than an end of the gap layer is, the end being located in the medium facing surface next to the second magnetic layer, and such that the yoke portion layer is magnetically connected to the pole portion layer at least at a surface of the pole portion layer that is closer to the gap layer, and that a portion where the yoke portion layer and the pole portion layer are connected to each other is located closer to the medium facing surface than a portion where the first magnetic layer and the yoke portion layer are connected to each other.

In the second method of manufacturing a thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and, a portion where the yoke portion layer and the pole portion layer are connected to each other is located closer to the medium facing surface than a portion where the first magnetic layer and the yoke portion layer are connected to each other. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the second method of manufacturing a thin-film magnetic head of the invention, the step of forming the gap layer, the thin-film coil and the second magnetic layer may include the steps of:

forming the thin-film coil and one part of the gap layer on the first magnetic layer, the one part of the gap layer insulating the thin-film coil from its surrounding;

forming the yoke portion layer on the first magnetic layer and the one part of the gap layer;

forming other part of the gap layer on the first magnetic layer, the one part of the gap layer and the yoke portion layer;

polishing the other part of the gap layer to expose the yoke portion layer and flattening top surfaces of the yoke portion layer and the other part of the gap layer;

forming a layer to be etched, the layer being made of a material for forming the pole portion layer, on the yoke portion layer and the other part of the gap layer that have been flattened; and etching the layer to be etched selectively by dry etching, thereby defining an outer shape of the pole portion layer that is in contact with the yoke portion layer and exposing the yoke portion layer, thereby forming a surface of the yoke portion layer that is farther from the gap layer.

In this case, the step of forming the gap layer, the thin-film coil and the second magnetic layer may further include, after the step of forming the layer to be etched, the step of flattening a top surface of the layer to be etched, by polishing.

In addition, the step of forming the gap layer, the thin-film coil and the second magnetic layer may further include, after the step of forming the layer to be etched, the steps of: forming a non-magnetic layer on the layer to be etched; and forming a mask corresponding to the shape of the pole portion layer, on the non-magnetic layer, and, in the step of etching the layer to be etched, the non-magnetic layer and the layer to be etched may be etched through the use of the mask. In the step of forming the mask, a resist frame having a gap portion corresponding to the shape of the pole portion layer may be formed on the non-magnetic layer, and the mask may be formed inside the gap portion of the resist frame.

Other and further objects, features and advantages of the invention will appear more fully from the following description.

BRIEF DESCRIPTION OF THE DRAWINGS

FIG. 40 is a perspective view illustrating the main part of the thin-film magnetic head shown in FIG. 39.

FIG. 41 is a cross-sectional view illustrating the main part of a modified example of the thin-film magnetic head shown in FIG. 39.

DETAILED DESCRIPTION OF THE PREFERRED EMBODIMENTS

Embodiments of the invention will now be described in detail with reference to the accompanying drawings.

[First Embodiment]

Figure 1:
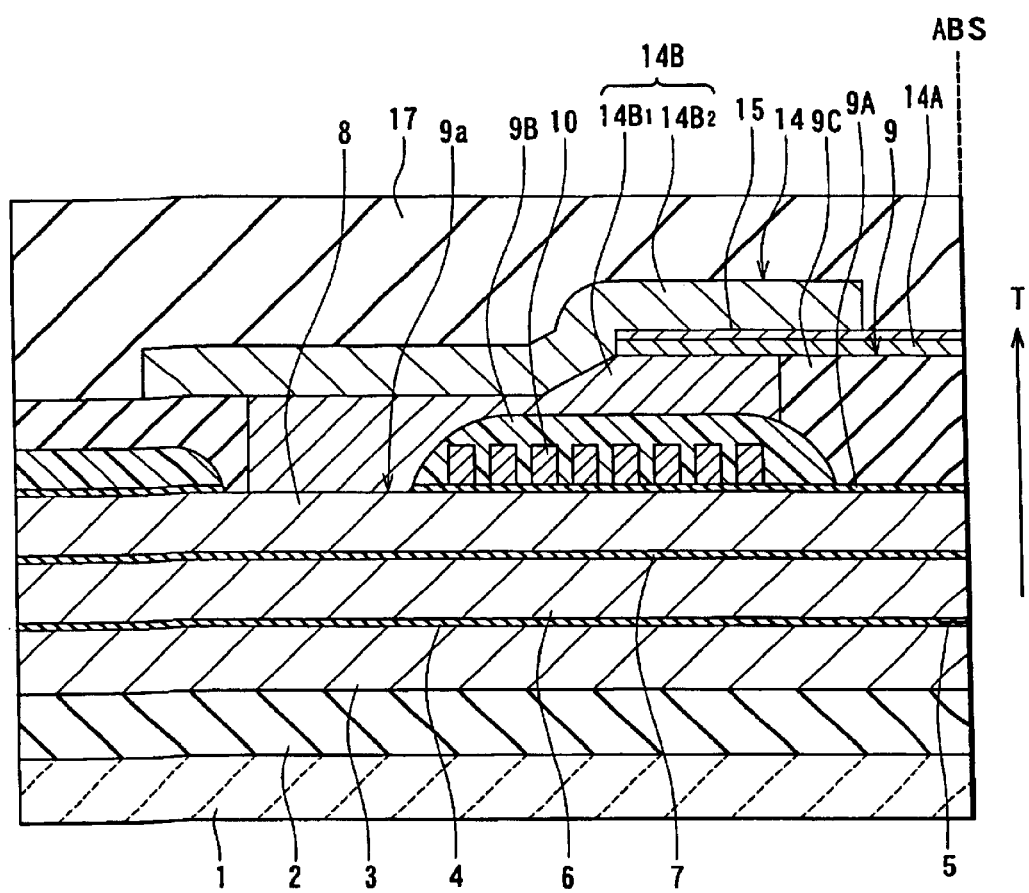
FIG. 1 is a cross-sectional view illustrating a structure of a thin-film magnetic head according to a first embodiment of the invention.
Figure 2:
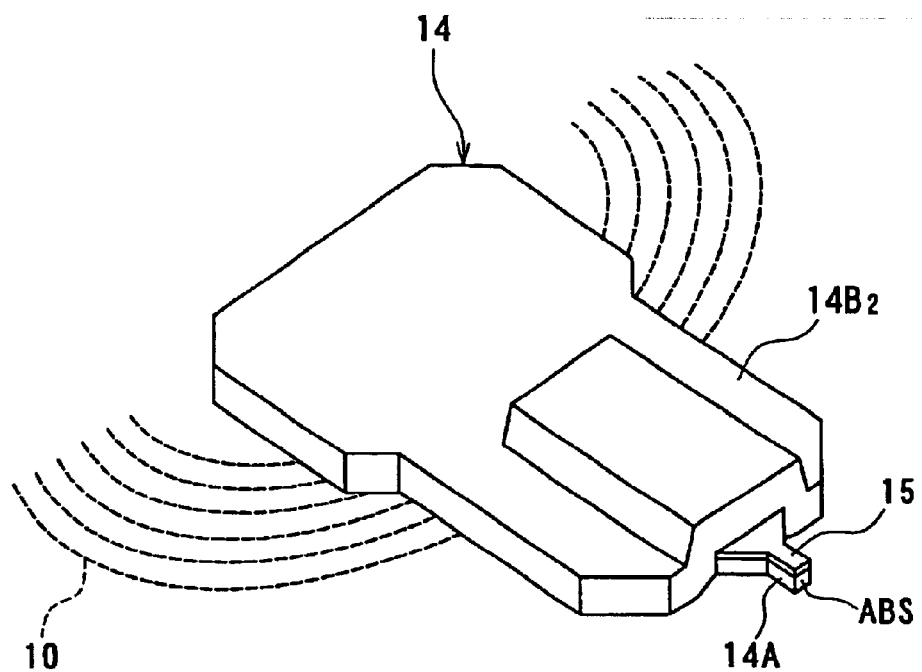
FIG. 2 is a perspective view illustrating the main part of the thin-film magnetic head shown in FIG. 1.
Figure 3:
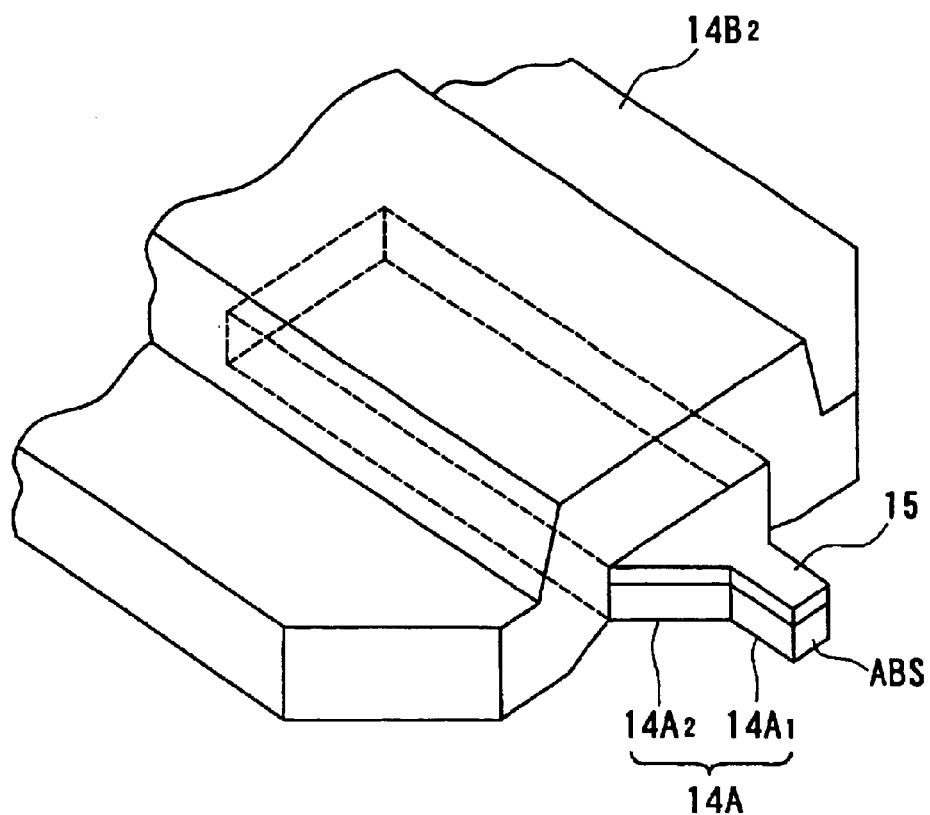
FIG. 3 is an enlarged perspective view illustrating the vicinity of the magnetic pole portion shown in FIG. 2.
Figure 4:
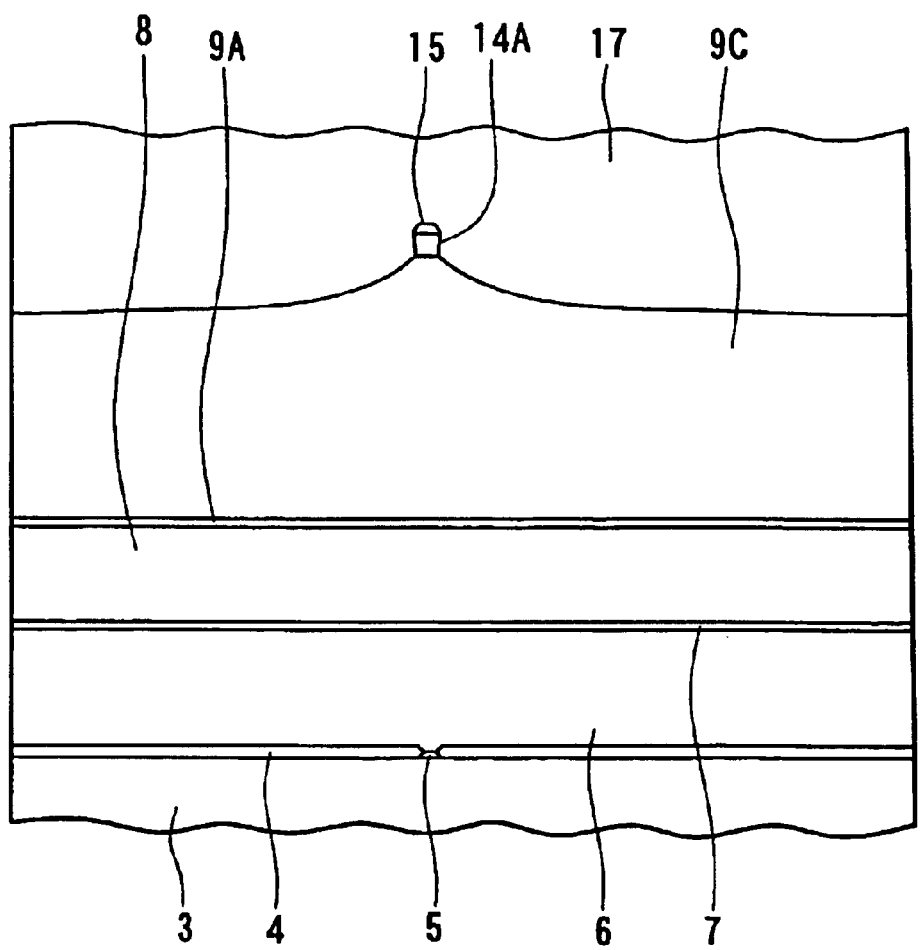
FIG. 4 is a front view illustrating part of the medium facing surface of the thin-film magnetic head shown in FIG. 1.
Figure 5:
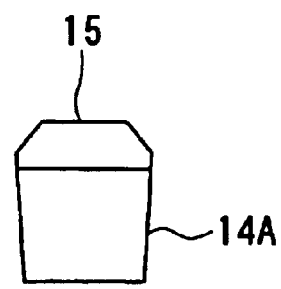
FIG. 5 is an enlarged front view illustrating the pole portion layer and the non-magnetic layer shown in FIG. 4.

A thin-film magnetic head according to a first embodiment of the invention will now be explained with reference to FIGS. 1 to 5. FIG. 1 is a cross-sectional view illustrating the structure of the thin-film magnetic head of this embodiment. FIG. 1 shows a cross section orthogonal to the medium facing surface and the surface of the substrate. In addition, the arrow indicated by symbol T in FIG. 1 shows the traveling direction of a recording medium. FIG. 2 is a perspective view illustrating the main part of the thin-film magnetic head shown in FIG. 1. FIG. 3 is an enlarged perspective view illustrating the vicinity of the magnetic pole portion shown in FIG. 2. FIG. 4 is a front view illustrating part of the medium facing surface of the thin-film magnetic head shown in FIG. 1. FIG. 5 is an enlarged front view illustrating the pole portion layer and the non-magnetic layer shown in FIG. 4.

As shown in FIG. 1, the thin-film magnetic head of this embodiment comprises: a substrate 1 made of a ceramic material such as aluminum oxide and titanium carbide ($Al_2O_3$. TiC); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 as a read element formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 $\mu$m.

One end of the MR element 5 is located in the medium facing surface (or the air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; an insulating layer 9A formed on a portion of the first magnetic layer 8 in which a thin-film coil 10 is to be formed; the thin-film coil 10 formed on the insulating layer 9A; and an insulating layer 9B that is filled at least between windings of the thin-film coil 10 and that is not exposed in the medium facing surface ABS. A contact hole 9a is formed in the insulating layer 9A at a distance from the medium facing surface ABS. In this embodiment, the insulating layer 9B is formed to entirely cover the thin-film coil 10.

For example, the first magnetic layer 8 has a thickness of 1 to 2 $\mu$m. The magnetic material for making the first magnetic layer 8 may be an iron-nickel-based alloy or Permalloy, or a high saturated magnetic flux density material to be described later.

The insulating layer 9A is made of a non-conductive and non-magnetic material such as alumina, and has a thickness of 0.1 to 1 $\mu$m, for example.

The thin-film coil 10 is made of a conductive material such as copper, and the winding thereof is 0.3 to 2 $\mu$m in thickness, for example. Thin-film coil 10 can have any number of turns of the winding as well as any pitch of the winding. In this embodiment, as an example, the winding of the thin-film coil 10 has a thickness of 1.3 $\mu$m, a width of 0.8 $\mu$m, a pitch of 1.3 $\mu$m, and the number of turns of 8. The thin-film coil 10 is wound around the contact hole 9a.

The insulating layer 9B is made of a non-conductive and non-magnetic material that exhibits fluidity during its formation. More specifically, the insulating layer 9B may be formed of an organic, non-conductive and non-magnetic material such as photoresist (a photosensitive resin), or a spin-on-glass (SOG) film of coating glass.

The thin-film magnetic head further comprises an insulating layer 9C which is formed on the insulating layer 9A in a region extending from a part of the insulating layer 9B located near the medium facing surface ABS to the medium facing surface ABS. The insulating layer 9C is exposed in the medium facing surface ABS. The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 3 to 6 $\mu$m.

The insulating layers 9A, 9B and 9C make up a gap layer 9 to be provided between the first magnetic layer 8 and a second magnetic layer 14 described later. The insulating layer 9B corresponds to the first portion of the gap layer of the present invention, and the insulating layers 9A and 9C correspond to the second portion of the gap layer of the present invention.

A surface of the thin-film coil 10, the surface being closer to the second magnetic layer 14, is located closer to the first magnetic layer 8 than an end of the gap layer 9 is, the end being located in the medium facing surface ABS next to the second magnetic layer 14 (or the end of the insulating layer 9C closer to the second magnetic layer 14).

The thin-film magnetic head further comprises the second magnetic layer 14 made of a magnetic material and formed on the gap layer 9, and a protective layer 17 made of a non-conductive and non-magnetic material such as alumina and formed to cover the second magnetic layer 14.

The second magnetic layer 14 has a pole portion layer 14A including a magnetic pole portion and a yoke portion layer 14B that serves as a yoke portion. The yoke portion layer 14B includes a first layer $14B_1$ and a second layer $14B_2$. The first layer $14B_1$ is in contact with and magnetically connected to the first magnetic layer 8 and a surface of the pole portion layer 14A that is closer to the gap layer 9. The second layer $14B_2$ is in contact with and magnetically connected to the first layer $14B_1$, an end surface of the pole portion layer 14A that is farther from the medium facing surface ABS (hereinafter referred to as the rear end surface), and both side surfaces of the pole portion layer 14A in the width direction.

The first layer $14B_1$ of the yoke portion layer 14B is formed on the first magnetic layer 8 and the insulating layer 9B to extend from where the contact hole 9a is formed toward the medium facing surface ABS, to an end surface of the insulating layer 9C that is farther from the medium facing surface ABS. The thickness of the first layer $14B_1$ at the position of the contact hole 9a is greater than the total thickness of the insulating layers 9A and 9B, and is equal to or greater than 3 $\mu$m, for example. For example, an end of the first layer $14B_1$ that is closer to the medium facing surface ABS is located at a distance of 1.5 µm or more from the medium facing surface ABS, and thus located closer to the medium facing surface ABS than the rear end surface of the pole portion layer 14A. In this embodiment, as an example, the distance from the medium facing surface ABS to the end of the first layer $14B_1$ closer to the medium facing surface ABS is 5 µm. The first layer $14B_1$ may be made of an iron-nickel-based alloy or Permalloy, or a high saturated magnetic flux density material to be described later.

The top surfaces of part of the first layer $14B_1$ of the yoke portion layer 14B located near the medium facing surface ABS and the insulating layer 9C are flattened. The pole portion layer 14A is formed on the flattened top surfaces of the first layer $14B_1$ and the insulating layer 9C. Accordingly, the first layer $14B_1$ of the yoke portion layer 14B is in contact with and magnetically connected to the surface of the pole portion layer 14A closer to the gap layer 9.

The thin-film magnetic head further comprises a non-magnetic layer 15 formed on the pole portion layer 14A. The second layer $14B_2$ of the yoke portion layer 14B is disposed on the first layer $14B_1$ and the non-magnetic layer 15. The second layer $14B_2$ is in contact with and magnetically connected to the first layer $14B_1$, the rear end surface of the pole portion layer 14A and both side surfaces of the pole portion layer 14A in the width direction. Part of the second layer $14B_2$ located near the medium facing surface ABS is adjacent to the top surface of the pole portion layer 14A via the non-magnetic layer 15, and magnetically connected to the pole portion layer 14A via the non-magnetic layer 15. For example, the second layer $14B_2$ of the yoke portion layer 14B is 0.5 to 2 µm in thickness. For example, the second layer $14B_2$ may be made of an iron-nickel-based alloy or Permalloy, or a high saturated magnetic flux density material to be described later.

The pole portion layer 14A is preferably 0.1 to 0.8 µm in thickness and more preferably 0.3 to 0.8 µm. In this embodiment, as an example, the pole portion layer 14A is 0.5 µm in thickness. In addition, the length from the medium facing surface ABS to the rear end surface of the pole portion layer 14A is 2 µm or greater. In this embodiment, as an example, the length is 10 µm.

As shown in FIG. 3, the pole portion layer 14A includes the first portion $14A_1$ located next to the medium facing surface ABS, and the second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. The second portion $14A_2$ of the pole portion layer 14A is laid over a portion of the first layer $14B_1$ of the yoke portion layer 14B located near the medium facing surface ABS. A portion of the second layer $14B_2$ of the yoke portion layer 14B located near the medium facing surface ABS is laid over the second portion $14A_2$ of the pole portion layer 14A via the non-magnetic layer 15.

The width of the first portion $14A_1$ in the medium facing surface ABS, that is, the track width, is preferably 0.5 µm or less, and more preferably 0.3 µm or less. The portion of the second portion $14A_2$ overlapping the yoke portion layer 14B has a width greater than that of the first portion $14A_1$ in the medium facing surface ABS, and the width is 2 µm or more, for example.

An end of the second layer $14B_2$ of the yoke portion layer 14B that is closer to the medium facing surface ABS is located, for example, at a distance of 1.5 µm or more from the medium facing surface ABS, and located closer to the medium facing surface ABS than the rear end surface of the pole portion layer 14A.

Furthermore, in this embodiment, an end of the second layer $14B_2$ of the yoke portion layer 14B opposite to the medium facing surface ABS is located farther from the medium facing surface ABS than the portion where the first layer $14B_1$ and the first magnetic layer 8 are magnetically coupled to each other.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe-M (including oxygen atoms as required), and Fe—Co-M (including oxygen atoms as required). In the foregoing, M is at least one element selected from the group consisting of Ni, N, C, B. Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS. The non-magnetic layer 15 is preferably 0.5 µm or less in thickness. In this embodiment, as an example, the non-magnetic layer 15 is 0.3 µm in thickness. It is also possible to omit the non-magnetic layer 15.

To form the non-magnetic layer 15, it is possible to use a material containing titanium or tantalum (including their alloys and oxides) or an inorganic, non-conductive and non-magnetic material such as alumina or silicon dioxide ($SiO_2$), for example. If dry etching is used to form the pole portion layer 14A, it is preferable that the non-magnetic layer 15 is formed of a material having a lower etching rate for the dry etching than those of the materials that form the pole portion layer 14A and the insulating layer 9C, of the gap layer 9, which is disposed in contact with the pole portion layer 14A. For example, available for this purpose are materials containing titanium or tantalum (including their alloys and oxides).

The surface of the pole portion layer 14A exposed in the medium facing surface ABS has a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. It is also preferable that the side of the surface of the pole portion layer 14A exposed in the medium facing surface ABS forms an angle of 80 to 88 degrees relative to the surface of the substrate 1.

As described above, the thin-film magnetic head of this embodiment comprises the medium facing surface ABS that faces toward the recording medium, a read head, and a write head. The read head comprises the MR element 5 functioning as a read element, and the bottom shield layer 3 and the top shield layer 6 for shielding the MR element 5. The bottom and top shield layers 3 and 6 have portions that are located on a side of the medium facing surface and opposed to each other with the MR element 5 interposed therebetween.

The write head comprises: the first magnetic layer 8 and the second magnetic layer 14 that are magnetically coupled to each other at a distance from the medium facing surface ABS and include magnetic pole portions disposed on a side of the medium facing surface ABS so as to oppose to each other with a predetermined spacing interposed therebetween along the traveling direction of the recording medium; the gap layer 9 made of a non-magnetic material and provided between the first magnetic layer 8 and the second magnetic layer 14; and the thin-film coil 10 at least a part of which is disposed between the first and second magnetic layers 8 and 14 and insulated from the first and second magnetic layers 8 and 14.

In this embodiment, a part of the thin-film coil 10 is disposed between the magnetic layers 8 and 14, and a surface of the part of the coil, the surface being located closer to the second magnetic layer 14 (the surface on the upper side of FIG. 1), is located closer to the first magnetic layer 8 (on the lower side of FIG. 1) than the end of the gap layer 9 (the end on the upper side of FIG. 1) located in the medium facing surface ABS next to the second magnetic layer 14.

In addition, the second magnetic layer 14 has: the pole portion layer 14A including the magnetic pole portion, the width of the pole portion layer 14A measured in the medium facing surface ABS defining the track width; and the yoke portion layer 14B that serves as a yoke portion and magnetically connects the pole portion layer 14A and the first magnetic layer 8 to each other. The pole portion layer 14A has a saturated magnetic flux density equal to or greater than that of the yoke portion layer 14B. The yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction.

The thin-film magnetic head according to the present embodiment is suitable for the vertical magnetic recording scheme. When this thin-film magnetic head is used for the vertical magnetic recording scheme, the first portion $14A_1$ of the pole portion layer 14A of the second magnetic layer 14 serves as a main magnetic pole, while the magnetic pole portion of the first magnetic layer 8 serves as an auxiliary magnetic pole. When the thin-film magnetic head of this embodiment is used for the vertical magnetic recording scheme, it is possible to use either a two-layered medium or a single-layered medium as the recording medium.

In the thin-film magnetic head of this embodiment, the second magnetic layer 14 has the pole portion layer 14A and the yoke portion layer 14B. The surface of at least part of the thin-film coil 10 closer to the second magnetic layer 14 is located closer to the first magnetic layer 8 than the end of the gap layer 9 located in the medium facing surface ABS next to the second magnetic layer 14. In addition, the yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction. Therefore, according to this embodiment, the yoke portion layer 14B forms a short magnetic path between the portion thereof magnetically coupled to the first magnetic layer 8 and the pole portion layer 14A, and it is possible to dispose the yoke portion layer 14B close to the thin-film coil 10.

Furthermore, in this embodiment, the pole portion layer 14A has a saturated magnetic flux density equal to or greater than that of the yoke portion layer 14B. In addition, the yoke portion layer 14B is magnetically connected to the pole portion layer 14A at least at the surface of the pole portion layer 14A closer to the gap layer, the rear end surface of the pole portion layer 14A, and both side surfaces of the pole portion layer 14A in the width direction. That is, the yoke portion layer 14B and the pole portion layer 14A are magnetically connected to each other in a large area. Therefore, this embodiment makes it possible to prevent a saturation of the magnetic flux halfway through the second magnetic layer 14.

With the features, according to this embodiment it is possible to improve electromagnetic conversion efficiency; to increase the intensity of the magnetic field generated from the magnetic pole portion of the second magnetic layer in a direction perpendicular to the surface of the recording medium; and to reduce the magnetic path length. The high-frequency characteristics are thereby improved. In particular, when the pole portion layer 14A is formed of a high saturated magnetic flux density material, it is possible to especially increase the intensity of the magnetic field in a direction perpendicular to the surface of the recording medium, and it is thereby possible to write data on a recording medium having an enhanced coercivity.

Furthermore, in the thin-film magnetic head of this embodiment, the magnetic field produced in a direction perpendicular to the surface of the recording medium is greater than a magnetic field in the longitudinal direction. Therefore, the magnetic energy produced by the head can be efficiently transferred to the recording medium. Accordingly, this thin-film magnetic head can be made impervious to heat fluctuations of the recording medium, and can thereby increase the linear recording density.

As shown in FIG. 1, in the thin-film magnetic head of this embodiment it is preferable to dispose the first magnetic layer 8 on the trailing side in the traveling direction T of the recording medium (or on the air-inflow-end side of the slider including the thin-film magnetic head), and to dispose the second magnetic layer 14 on the leading side in the traveling direction T of the recording medium (or on the air-outflowend side of the slider including the thin-film magnetic head). For the vertical magnetic recording scheme, this arrangement allows the magnetization reversal transition width to be reduced in the recording medium, as compared with a reverse of this arrangement. This makes it possible to form a magnetization pattern of a higher density on the recording medium, resulting in a higher linear recording density.

Furthermore, as shown in FIG. 1, in the thin-film magnetic head of this embodiment the yoke portion layer 14B includes: the first layer $14B_1$ that is in contact with and magnetically connected to the first magnetic layer 8 and the surface of the pole portion layer 14A closer to the gap layer 9; and the second layer $14B_2$ that is in contact with and magnetically connected to the first layer $14B_1$, the rear end surface of the pole portion layer 14A, and both side surfaces of the pole portion layer 14A in the width direction. Formation of the yoke portion layer 14B is thereby facilitated.

The second layer $14B_2$ of the yoke portion layer 14B is further magnetically connected to the surface of the pole portion layer 14A farther from the gap layer 9. This allows a magnetic flux to be introduced into the pole portion layer 14A from the second layer $14B_2$ of the yoke portion layer 14B through the surface of the pole portion layer 14A farther from the gap layer 9, too, thereby making it possible to improve electromagnetic conversion efficiency.

Furthermore, as shown in FIG. 1, in the thin-film magnetic head of this embodiment the end of each of the first and second layers $14B_1$ and $14B_2$ of the yoke portion layer 14B closer to the medium facing surface ABS is located at a distance from the medium facing surface ABS. This makes it possible to prevent the magnetic field, produced from the end of each of the first and second layers $14B_1$ and $14B_2$ of the yoke portion layer 14B closer to the medium facing surface ABS, from causing writing of information onto the recording medium.

Furthermore, as shown in FIG. 2, in the thin-film magnetic head of this embodiment, the portion of the pole portion layer 14A that is in contact with the yoke portion layer 14B has a width greater than the width of the pole portion layer 14A measured in the medium facing surface ABS. This allows the portion of the pole portion layer 14A that is in contact with the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, the portion of the pole portion layer 14A exposed in the medium facing surface ABS can be made smaller in area, to make it possible to increase the intensity of magnetic field applied to the recording medium.

In the thin-film magnetic head of this embodiment, the length from the medium facing surface ABS to the rear end surface of the pole portion layer 14A is 2 $\mu$m or more. This allows to increase the area of the portion of the pole portion layer 14A that is in contact with the yoke portion layer 14B, without increasing the thickness or width of the pole portion layer 14A. Saturation of magnetic flux is thereby prevented at this portion. Consequently, it is possible to introduce the magnetic flux efficiently from the yoke portion layer 14B into the pole portion layer 14A.

Furthermore, as show in FIG. 1, the thin-film magnetic head of this embodiment has the non-magnetic layer 15 that is in contact with the surface of the pole portion layer 14A farther from the gap layer 9. This makes it possible to prevent the surface of the pole portion layer 14A farther from the gap layer 9 from being damaged when forming the pole portion layer 14A by dry etching or when forming the yoke portion layer 14B by electroplating, and thereby possible to make the surface flat. Particularly, this embodiment allows the end of the pole portion layer 14A farther from the gap layer 9 to be kept flat in the medium facing surface ABS, since the non-magnetic layer 15 is exposed in the medium facing surface ABS. This allows the magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

Furthermore, in this embodiment, part of the yoke portion layer 14B located near the medium facing surface ABS, that is, part of the second layer $14B_2$ located near the medium facing surface ABS, is adjacent to the surface of the pole portion layer 14A farther from the gap layer 9 via the non-magnetic layer 15, and magnetically connected to the pole portion layer 14A via the non-magnetic layer 15. Consequently, it is possible to introduce a magnetic flux to the medium-facing-surface-ABS side of the pole portion layer 14A from part of the yoke portion layer 14B, too, via the non-magnetic layer 15.

If the non-magnetic layer 15 is formed of a material having a less etching rate than those of the materials forming the pole portion layer 14A and the portion of the gap layer 9 that is in contact with the pole portion layer 14A, it is possible to prevent the surface of the pole portion layer 14A farther from the gap layer 9 from being damaged when forming the pole portion layer 14A by dry etching.

In the thin-film magnetic head of this embodiment, as shown in FIG. 1, part of the thin-film coil 10 is disposed between the first magnetic layer 8 and the second magnetic layer 14, and the part of the coil is located closer to the first magnetic layer 8 than a midpoint between the first magnetic layer 8 and the pole portion layer 14A of the second magnetic layer 14. This arrangement allows the first magnetic layer 8 that is larger in volume than the second magnetic layer 14 to efficiently absorb the magnetic field produced by the thin-film coil 10. It is thereby possible to increase the absorptivity of magnetic field in the first and second magnetic layers 8 and 14 in comparison with the case where the thin-film coil 10 is located closer to the second magnetic layer 14.

As shown in FIG. 1, in the thin-film magnetic head of this embodiment, the gap layer 9 comprises: the first portion (the insulating layer 9B) that is made of a material exhibiting fluidity during its formation, filled at least in between the windings of the thin-film coil 10 and not exposed in the medium facing surface; and the second portion (the insulating layers 9A, 9C) that is made of a material having a better resistance to corrosion, rigidity, and insulation property than those of the first portion, and exposed in the medium facing surface. The first portion (the insulating layer 9B) is completely covered with the second portion (the insulating layers 9A, 9C) and the first layer 14B, of the yoke portion layer 14B. Although it is difficult to completely fill in the spaces between the windings of the thin-film coil 10 with a non-magnetic material by sputtering, it is made easy by using a non-magnetic material having fluidity like organic materials. Nevertheless, organic materials lack reliability in resistance to dry etching, resistance to corrosion, resistance to heat, rigidity and the like. In this embodiment, as described above, the first portion (the insulating layer 9B) is formed of a material that exhibits fluidity during its formation, and is filled in between the windings of the thin-film coil 10. In addition, the second portion (the insulating layers 9A, 9C), which covers part of the first portion and is exposed in the medium facing surface, is formed of a material having a better resistance to corrosion, rigidity, and insulation property than those of the first portion. Accordingly, it is possible to completely fill the spaces between the windings of the thin-film coil 10 with the non-magnetic material and to thereby increase the reliability of the gap layer 9.

The thin-film magnetic head of this embodiment further comprises the MR element 5 serving as a read element. It is thereby possible to improve the read performance as compared with the case where reading is performed by using an induction-type electromagnetic transducer. Since the MR element 5 is shielded with the shield layers 3 and 6, the resolution of read operations is improved.

Figure 6:
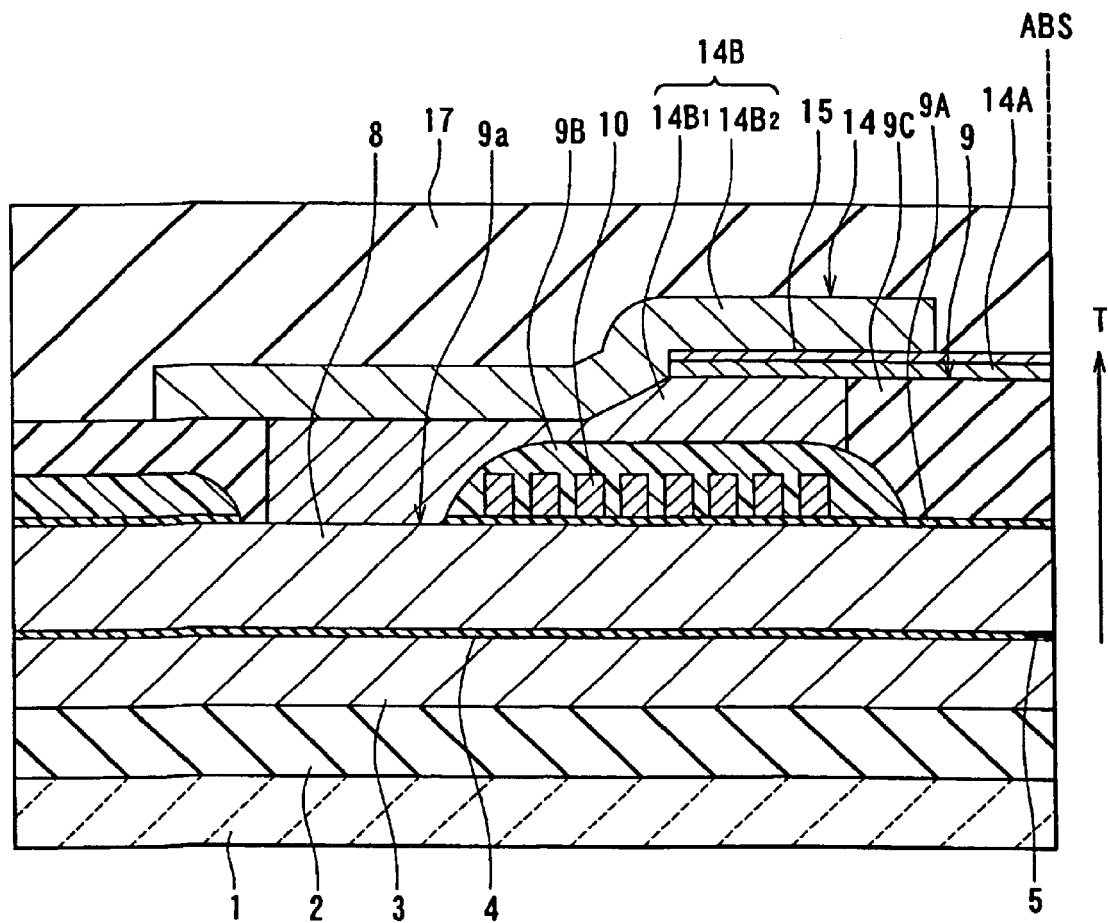
FIG. 6 is a cross-sectional view illustrating a structure of a thin-film magnetic head according to a modified example of the first embodiment of the invention.

Now, referring to FIG. 6, a modified example of the thin-film magnetic head according to this embodiment is explained below. FIG. 6 is a cross-sectional view illustrating the structure of a thin-film magnetic head of the modified example. FIG. 6 illustrates a cross section orthogonal to the medium facing surface and the surface of the substrate.

In the thin-film magnetic head of this modified example, the top shield layer 6 and the non-magnetic layer 7 of the thin-film magnetic head shown in FIG. 1 are eliminated and the first magnetic layer 8 also serves as the top shield layer 6. It simplifies the structure of the thin-film magnetic head and facilitates manufacture of the head. The remainder of the structure of the thin-film magnetic head of this modified example is the same as that of the thin-film magnetic head of FIG. 1.

Now, referring to FIGS. 7 to 22, a method of manufacturing the thin-film magnetic head according to this embodiment is explained below. Here, the method is explained with reference to the thin-film magnetic head shown in FIG. 1 as an example. However, the same method may be used to manufacture the thin-film magnetic head shown in FIG. 6, except that the steps of forming the top shield layer 6 and the non-magnetic layer 7 are eliminated in the manufacture of the head shown in FIG. 6.

According to the method of manufacturing the thin-film magnetic head of this embodiment, the insulating layer 2 is first formed on the substrate 1. Then, the bottom shield layer 3 is formed on the insulating layer 2. In FIGS. 7 to 22, the substrate 1 and the insulating layer 2 are not shown.

Figure 7:
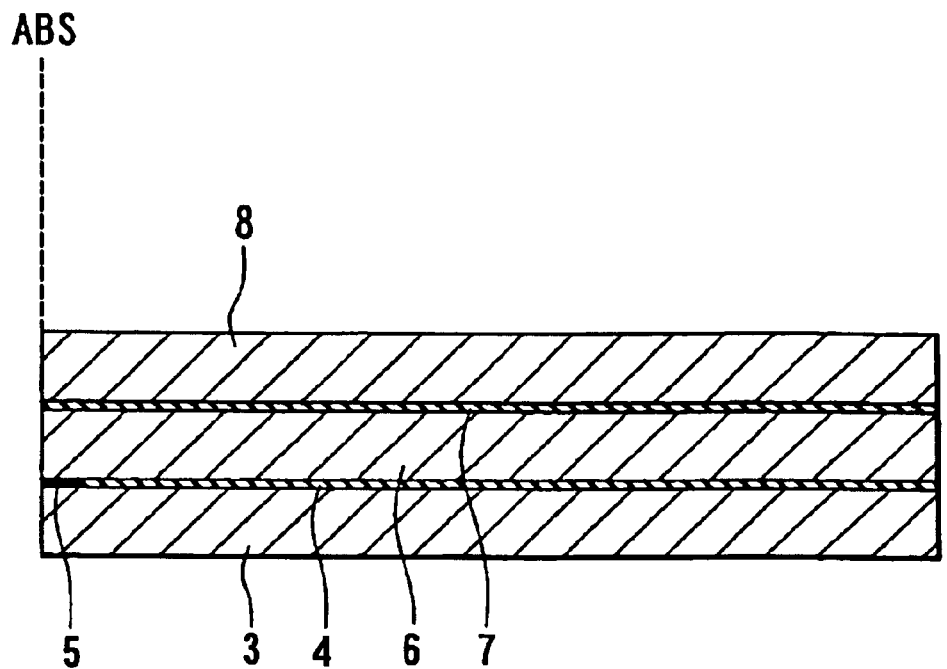
FIG. 7 is a cross-sectional view illustrating a step of a method of manufacturing the thin-film magnetic head according to the first embodiment of the invention.

Then, as shown in FIG. 7, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. Then, on the non-magnetic layer 7, the first magnetic layer 8 is formed into a predetermined shape. Then, although not shown, the non-magnetic layer 7 and the first magnetic layer 8 are covered with a non-magnetic material such as alumina. The non-magnetic material is then polished to expose the first magnetic layer 8, and the top surface of the first magnetic layer 8 is flattened.

Figure 8:
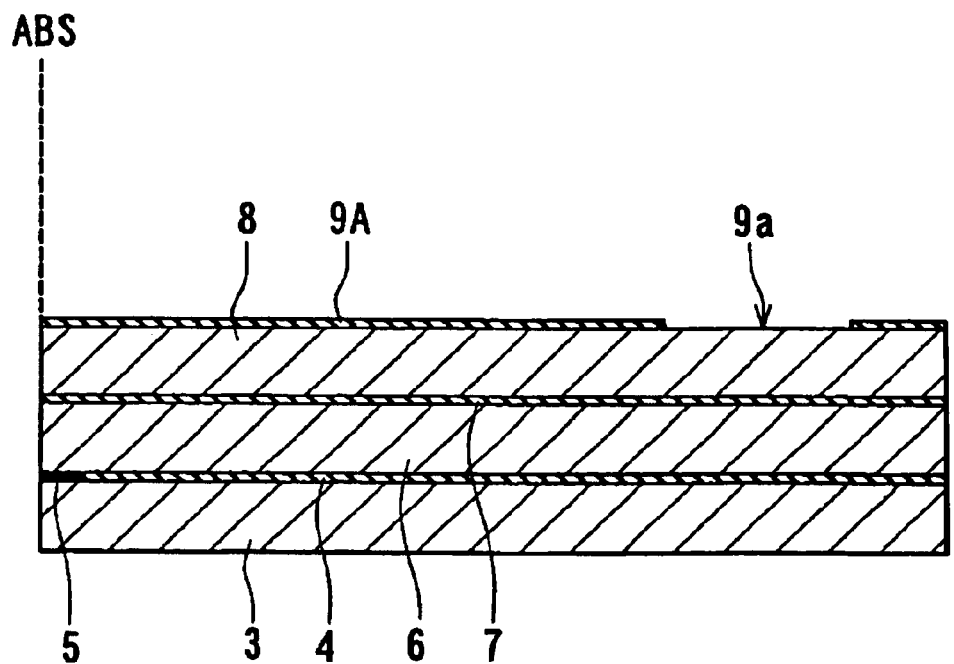
FIG. 8 is a cross-sectional view illustrating a step that follows FIG. 7.

Then, as shown in FIG. 8, a non-conductive and non-magnetic material such as alumina is sputtered onto the first magnetic layer 8 to form the insulating layer 9A. Subsequently, through the use of a known photolithography technique and dry etching, the contact hole 9a is formed in the insulating layer 9A where the first magnetic layer 8 and the second magnetic layer 14 as described later are to be coupled to each other.

Figure 9:
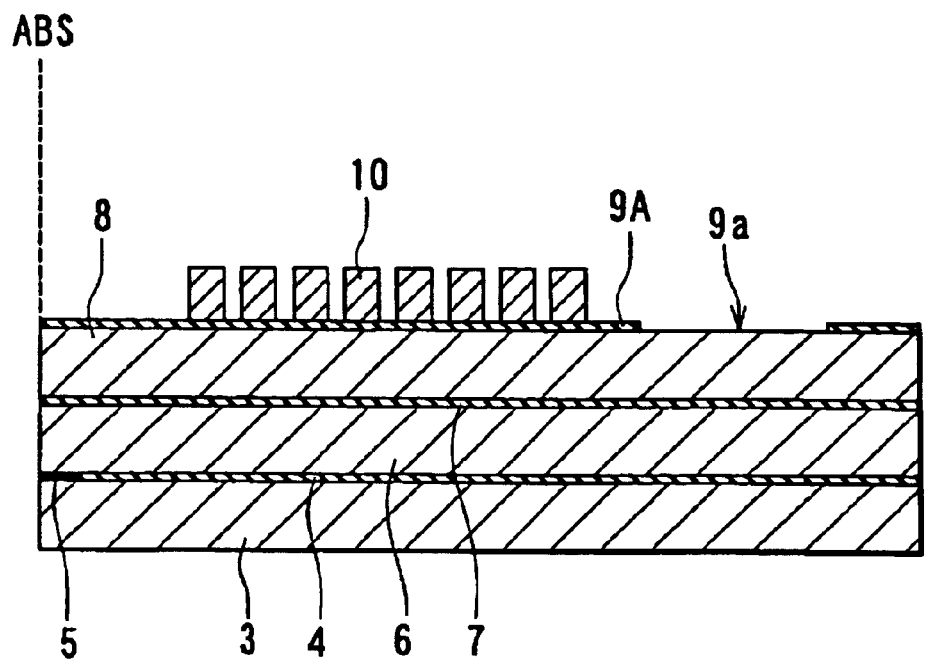
FIG. 9 is a cross-sectional view illustrating a step that follows FIG. 8.

Then, as shown in FIG. 9, the thin-film coil 10 is formed on the insulating layer 9A with a known photolithography technique and a known deposition technique (e.g., electroplating).

Figure 10:
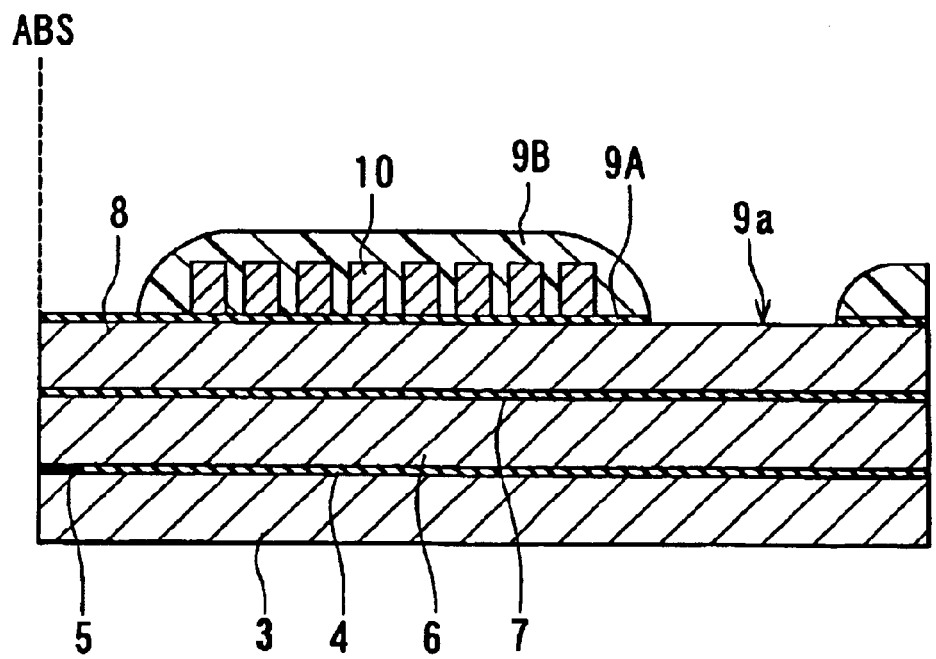
FIG. 10 is a cross-sectional view illustrating a step that follows FIG. 9.

Then, as shown in FIG. 10, the insulating layer 9B to fill at least the spaces between the windings of the thin-film coil 10 is formed with a known photolithography technique. In this embodiment, the insulating layer 9B is formed so as to cover the thin-film coil 10 completely. However, after formation of the insulating layer 9B that fills the spaces between the windings of the thin-film coil 10, another insulating layer may be formed to cover the thin-film coil 10 and the insulating layer 9B.

Figure 11:
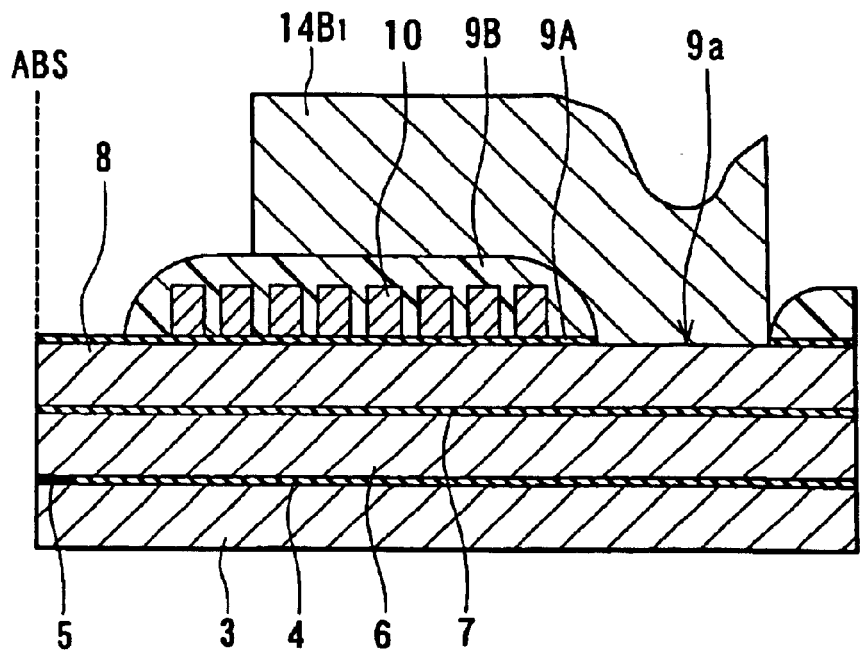
FIG. 11 is a cross-sectional view illustrating a step that follows FIG. 10.

Then, as shown in FIG. 11, with a known photolithography technique and a known deposition technique (e.g., electroplating), the first layer $14B_1$ of the yoke portion layer 14B is formed on the first magnetic layer 8 and the insulating layer 9B to extend from where the contact hole 9a is formed to a predetermined position towards the medium facing surface ABS. At this stage, for example, the first layer $14B_1$ is shaped to have a thickness of 3 $\mu$m or more, a depth (or a length perpendicular to the medium facing surface ABS) of 2 to 10 $\mu$m, and a width of 5 to 20 $\mu$m.

Figure 12:
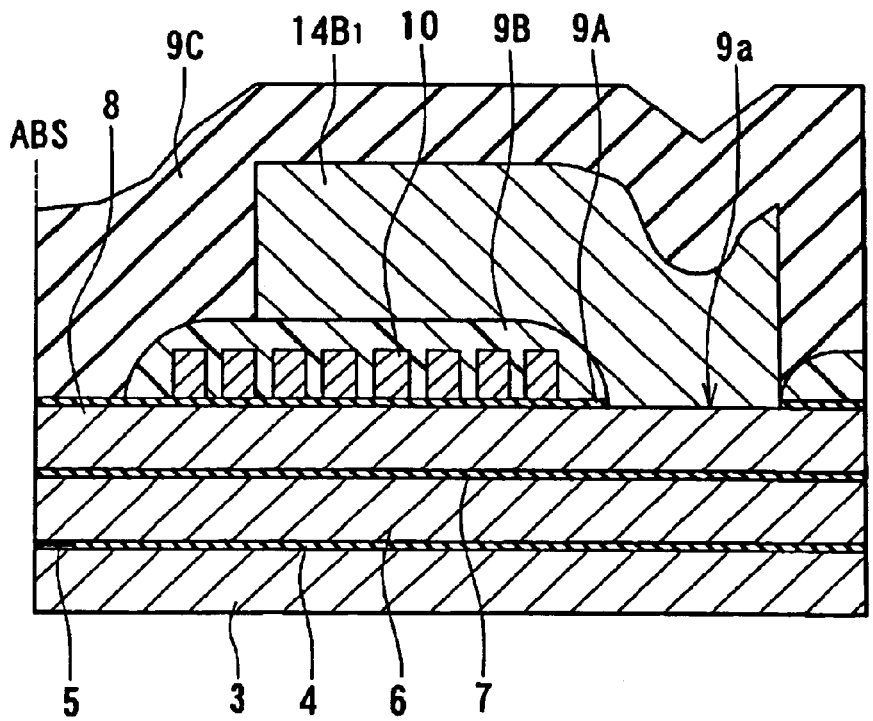
FIG. 12 is a cross-sectional view illustrating a step that follows FIG. 11.

Then, as shown in FIG. 12, the insulating layer 9C is formed by sputtering, so as to cover the insulating layer 9A, the insulating layer 9B, and the first layer 14B, of the yoke portion layer 14B. At this stage, the insulating layer 9C has a thickness equal to or greater than that of the first layer $14B_1$.

Figure 13:
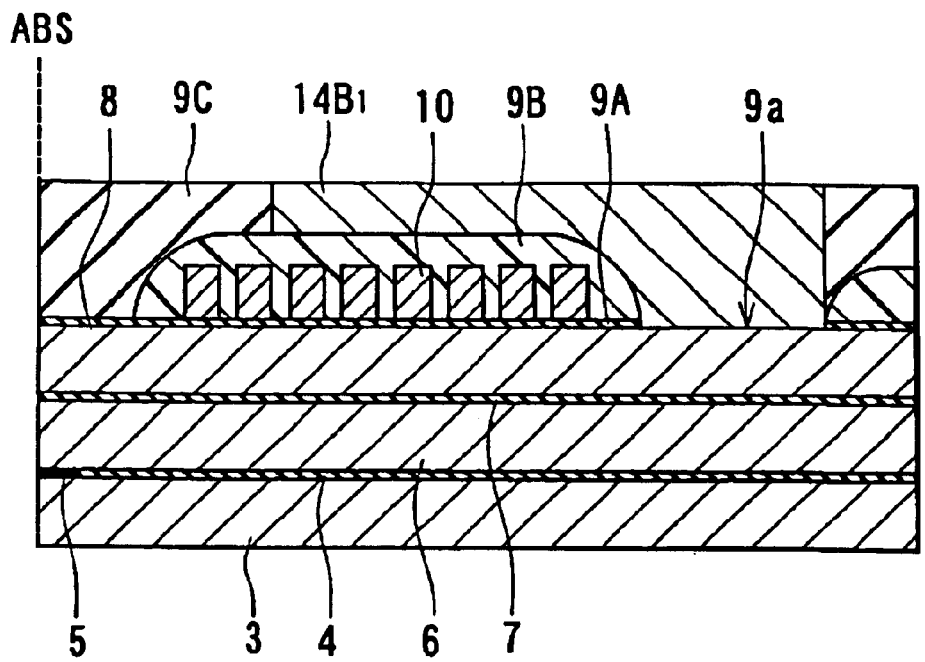
FIG. 13 is a cross-sectional view illustrating a step that follows FIG. 12.

Then, as shown in FIG. 13, the surface of the insulating layer 9C is polished by chemical mechanical polishing, for example, to expose the first layer $14B_1$ of the yoke portion layer 14B, and the top surfaces of the insulating layer 9C and the first layer $14B_1$ are flattened. At this stage, the distance from the top surface of the first magnetic layer 8 to the top surface of the insulating layer 9C is 3 to 6 $\mu$m, for example.

Figure 14:
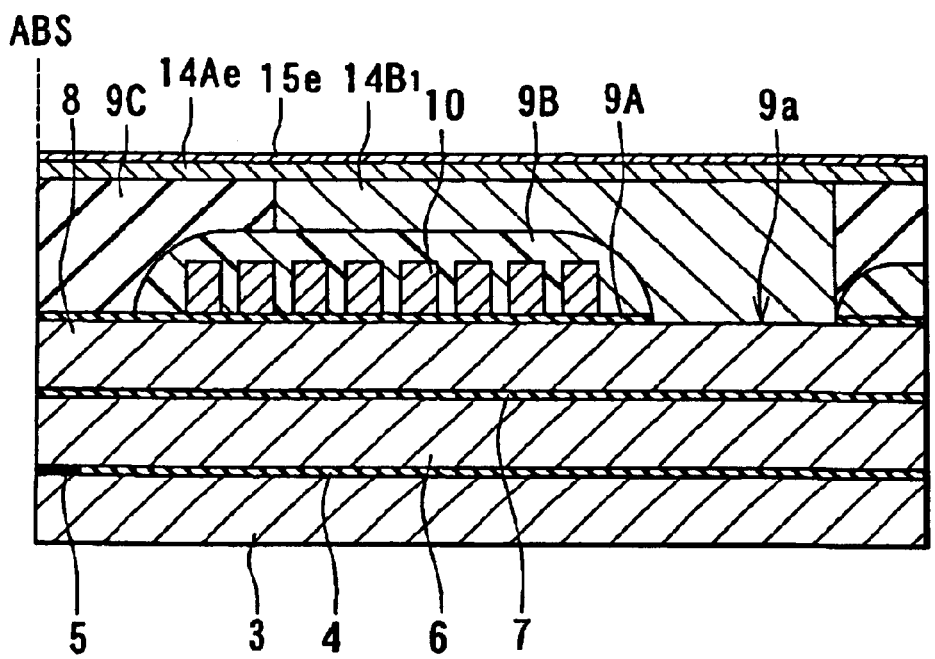
FIG. 14 is a cross-sectional view illustrating a step that follows FIG. 13.

Then, as shown in FIG. 14, on the insulating layer 9C and the first layer $14B_1$, a layer 14Ae to be etched is formed of a material for forming the pole portion layer 14A of the second magnetic layer 14. The layer 14Ae preferably has a thickness of 0.1 to 0.8 $\mu$m, and more preferably a thickness of 0.3 to 0.8 $\mu$m. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e is preferably equal to or less than 0.5 $\mu$m in thickness.

Then, although not shown, an electrode layer for electroplating is formed by sputtering on the non-magnetic layer 15e. The electrode layer is equal to or less than 0.1 $\mu$m in thickness and made of an iron-nickel alloy, for example.

Figure 15:
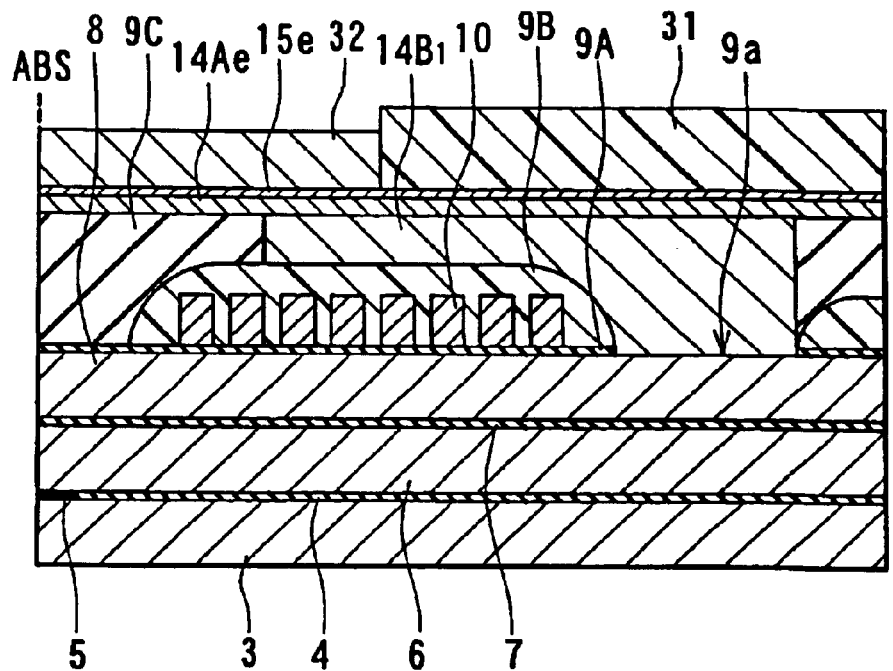
FIG. 15 is a cross-sectional view illustrating a step that follows FIG. 14.

Then, as shown in FIG. 15, a resist frame 31, which has a gap portion corresponding to the shape of the pole portion layer 14A, is formed of a photoresist on the aforementioned electrode layer by photolithography. Using the resist frame 31, a plating film that serves as a mask 32 corresponding to the shape of the pole portion layer 14A is formed on the aforementioned electrode layer by electroplating (frame plating). This plating film is 1 to 4 $\mu$m in thickness and made of an iron-nickel alloy, for example. The resist frame 31 is then removed.

Figure 16:
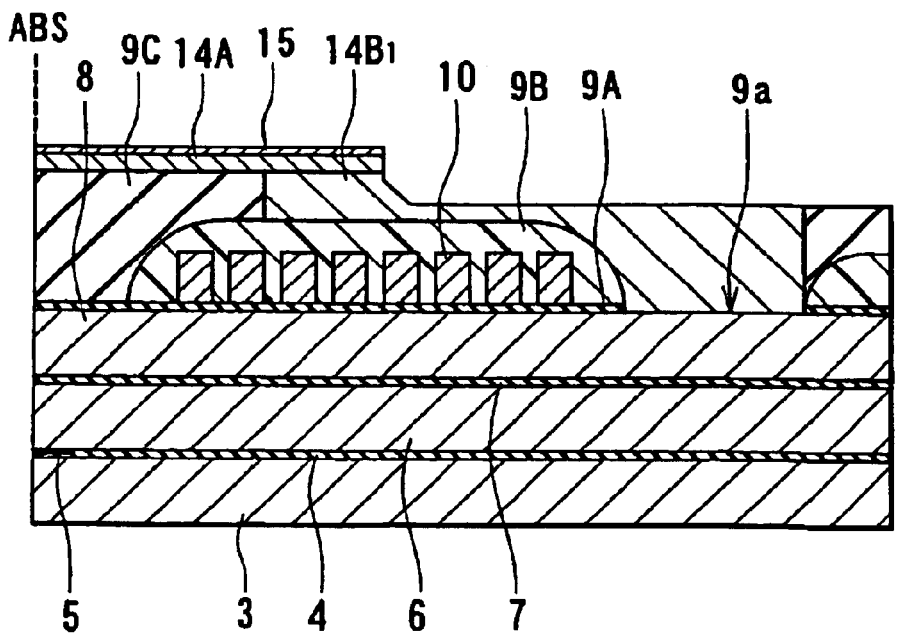
FIG. 16 is a cross-sectional view illustrating a step that follows FIG. 15.

Then, as shown in FIG. 16, using the mask 32, the non-magnetic layer 15e and the layer 14Ae are etched by dry etching such as ion milling to form the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like.

Through the aforementioned etching, the surface of the pole portion layer 14A exposed in the medium facing surface ABS is allowed to have a shape as shown in FIGS. 4 and 5. It may have a shape of a rectangle, or a shape of a trapezoid or a triangle in which the lower side located on the trailing side in the traveling direction T of the recording medium (or on the air-inflow-end side of the slider) is shorter than the upper side. The side surfaces of the pole portion layer 14A may be concave. Also, through the aforementioned etching, the width of the pole portion layer 14 in the medium facing surface ABS may be defined so as to agree with the specification of the track width.

Through the aforementioned etching, the non-magnetic layer 15 and the pole portion layer 14A are formed and the first layer $14B_1$ of the yoke portion layer 14B is exposed.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to form the non-magnetic layer 15 and the pole portion layer 14A and to expose the first layer $14B_1$ of the yoke portion layer 14B. Thereafter, the patterned resist may be removed.

Figure 17:
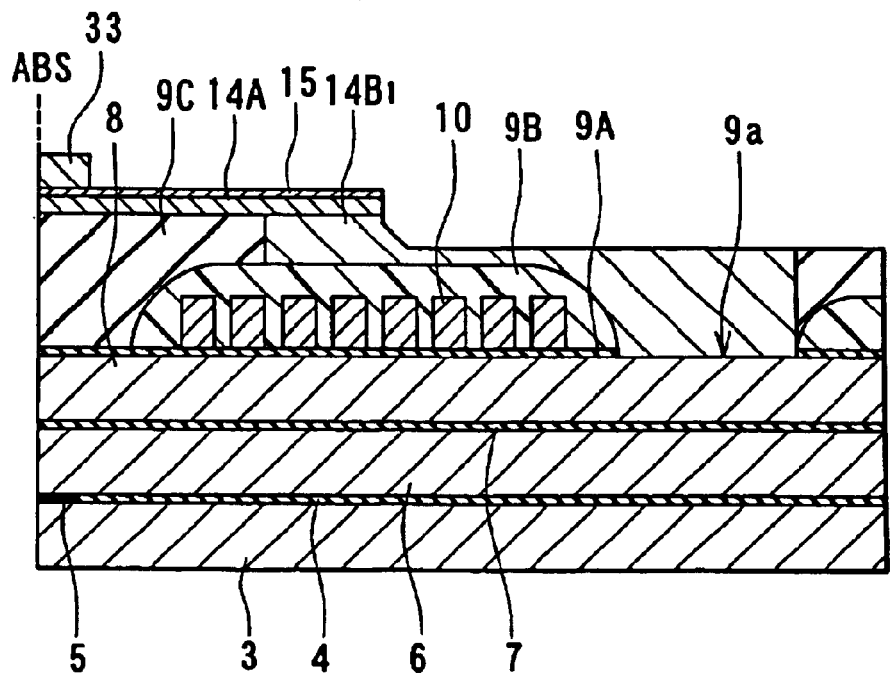
FIG. 17 is a cross-sectional view illustrating a step that follows FIG. 16.

Then, as shown in FIG. 17, a resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 18:
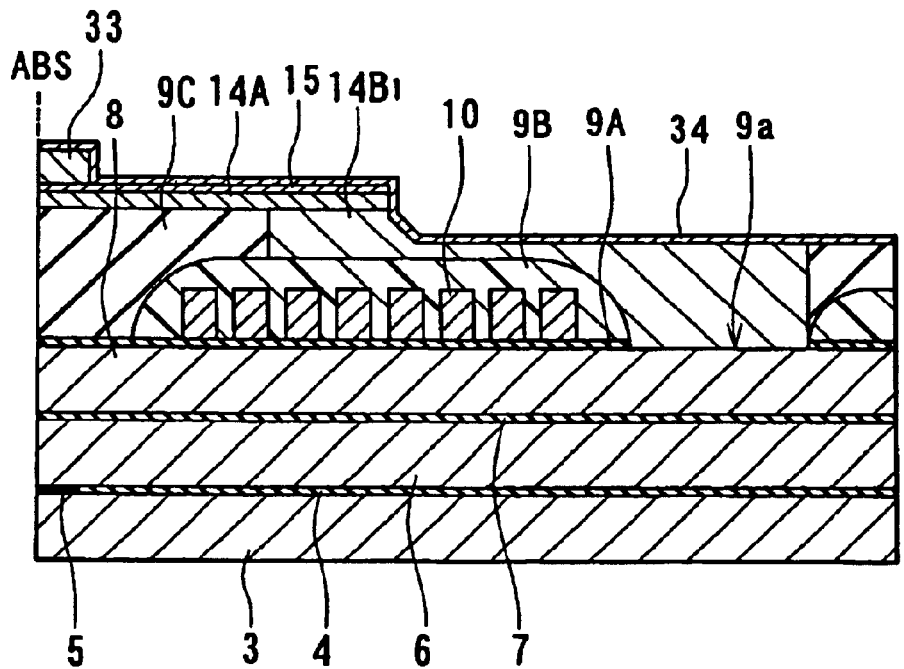
FIG. 18 is a cross-sectional view illustrating a step that follows FIG. 17.

Then, as shown in FIG. 18, an electrode layer 34 for electroplating is formed by sputtering on the resist cover 33, the pole portion layer 14A (and the non-magnetic layer 15), and the first layer $14B_1$ of the yoke portion layer 14B. The electrode layer 34 may have a thickness of 0.1 μm or less, and may be formed of an iron-nickel alloy, with Ti (titanium) deposited to underlie the electrode layer 34.

Figure 19:
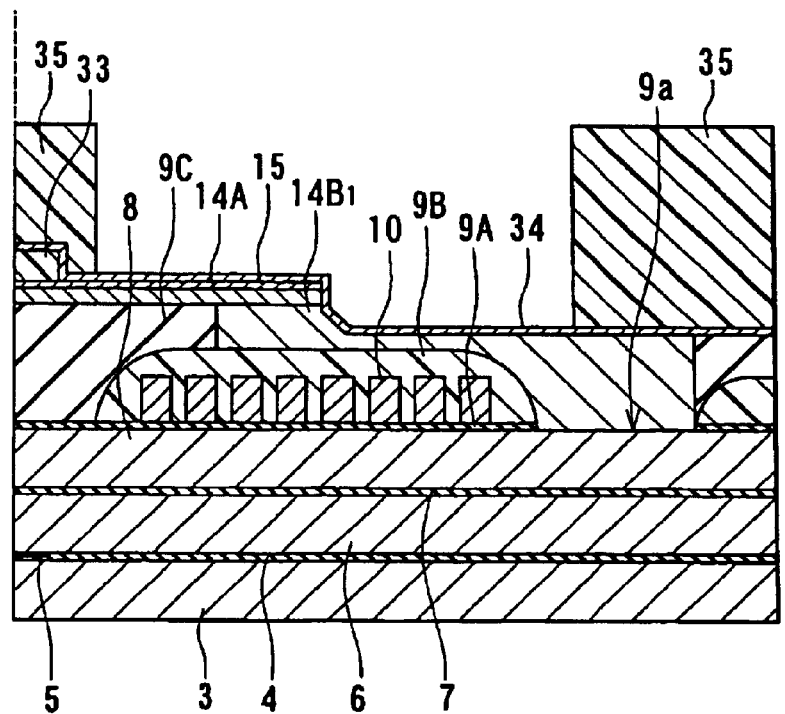
FIG. 19 is a cross-sectional view illustrating a step that follows FIG. 18.

Then, as shown in FIG. 19, a resist frame 35 having a gap portion corresponding to the shape of the second layer $14B_2$ of the yoke portion layer 14B is formed of a photoresist on the electrode layer 34.

Figure 20:
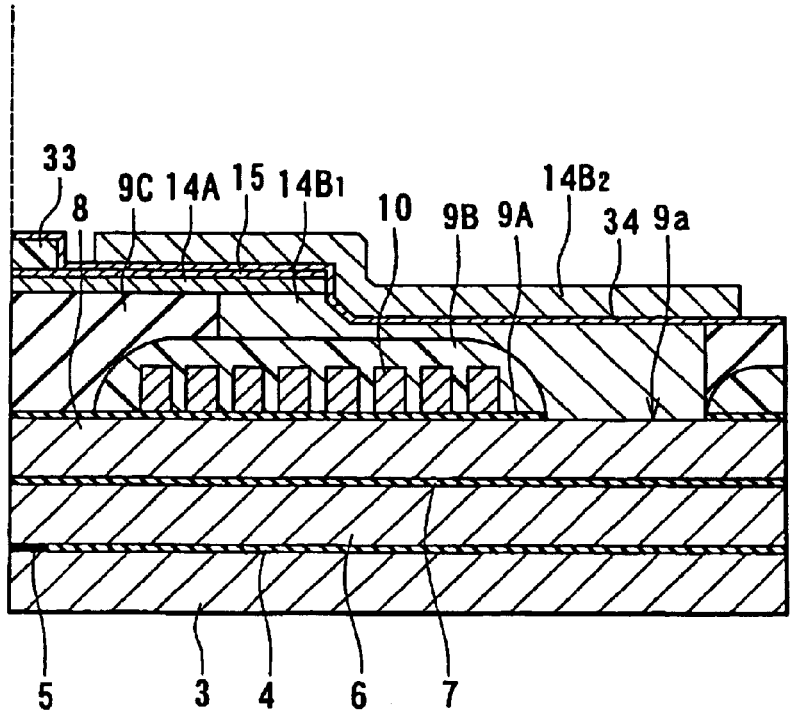
FIG. 20 is a cross-sectional view illustrating a step that follows FIG. 19.

Then, as shown in FIG. 20, using the resist frame 35, the second layer $14B_2$ of the yoke portion layer 14B is formed on the electrode layer 34 by electroplating (frame plating). The resist frame 35 is then removed. Although the second layer $14B_2$ can be formed using the lift-off method, electroplating is most preferably used to allow the shape of the second layer $14B_2$ to follow the shape of the base thereof.

Figure 21:
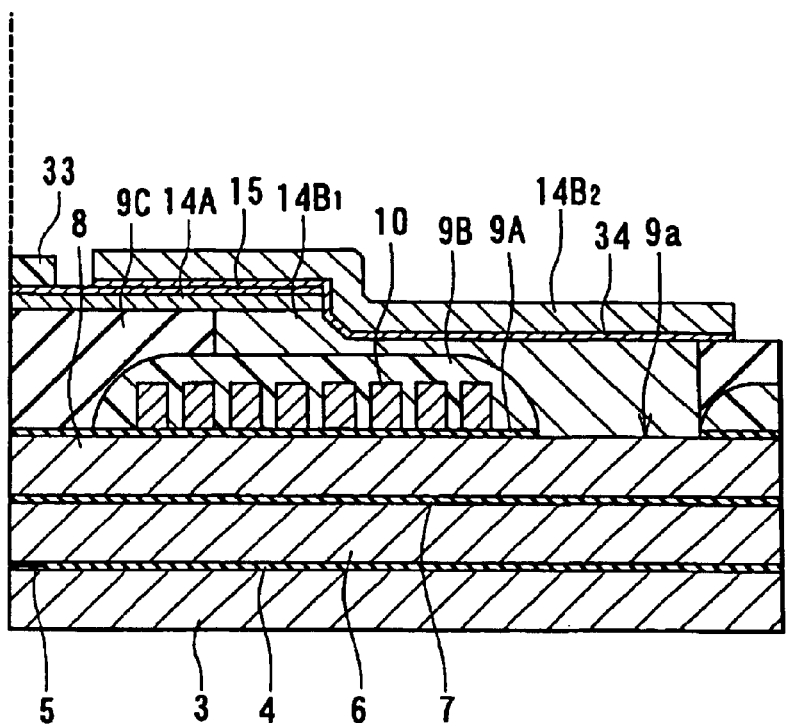
FIG. 21 is a cross-sectional view illustrating a step that follows FIG. 20.

Then, as shown in FIG. 21, the electrode layer 34 except for the portion underlying the second layer $14B_2$ of the yoke portion layer 14B is removed by dry etching.

Figure 22:
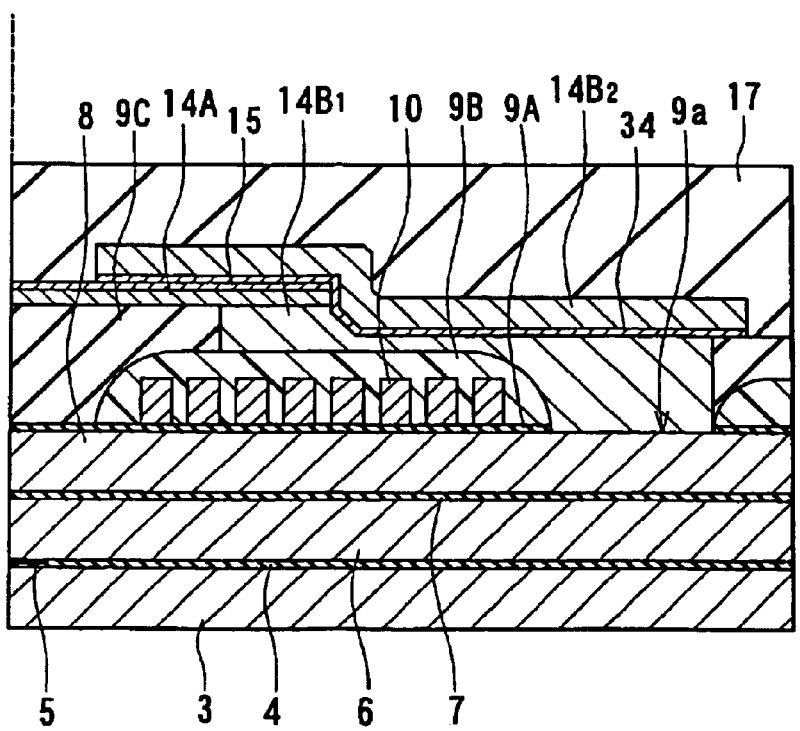
FIG. 22 is a cross-sectional view illustrating a step that follows FIG. 21.

Then, as shown in FIG. 22, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

As described above, the method of manufacturing the thin-film magnetic head of this embodiment comprises the steps of: forming the first magnetic layer 8; and forming the gap layer 9, the thin-film coil 10, and the second magnetic layer 14 on the first magnetic layer 8 such that the surface of at least part of the thin-film coil 10 closer to the second magnetic layer 14 is located closer to the first magnetic layer 8 than the end of the gap layer 9 located in the medium facing surface ABS next to the second magnetic layer 14, and such that the yoke portion layer 14B is magnetically connected to the pole portion layer 14A at least at the surface of the pole portion layer 14A closer to the gap layer 9, the rear end surface of the pole portion layer 14A, and both side surfaces of the pole portion layer 14A in the width direction. The method of manufacturing the thin-film magnetic head provides the same functions and effects as those of the thin-film magnetic head according to this embodiment.

According to the method of manufacturing the thin-film magnetic head of this embodiment, the step of forming the gap layer 9, the thin-film coil 10, and the second magnetic layer 14 on the first magnetic layer 8 includes the steps of: forming, on the first magnetic layer 8, the thin-film coil 10 and the insulating layer 9B that forms a part of the gap layer 9 for insulating the thin-film coil 10 from its surrounding; forming the first layer $14B_1$ of the yoke portion layer 14B on the first magnetic layer 8 and the insulating layer 9B; forming the insulating layer 9C that forms the other part of the gap layer 9, on the first magnetic layer 8, the insulating layer 9B and the first layer $14B_1$; polishing the insulating layer 9C to expose the first layer $14B_1$ and flattening the top surfaces of the first layer $14B_1$ and the insulating layer 9C; forming the layer 14Ae to be etched, the layer 14Ae being made of a material for forming the pole portion layer 14A, on the flattened first layer $14B_1$ and insulating layer 9C; etching the layer 14Ae selectively by dry etching, so as to define the outer shape of the pole portion layer 14A that is in contact with the first layer $14B_1$ and to expose the first layer $14B_1$; and forming the second layer $14B_2$ of the yoke portion layer 14B on the first layer $14B_1$.

As described above, according to this embodiment, the first layer $14B_1$ of the yoke portion layer 14B is formed before the pole portion layer 14A is formed, and the second layer $14B_2$ of the yoke portion layer 14B is formed after the pole portion layer 14A has been formed. This facilitates the formation of the yoke portion layer 14B that is magnetically connected to the pole portion layer 14A at least at the surface of the pole portion layer 14A closer to the gap layer 9, the rear end surface of the pole portion layer 14A, and both side surfaces of the pole portion layer 14A in the width direction.

Furthermore, according to this embodiment, prior to the step of forming the layer 14Ae to be etched, the top surfaces of the insulating layer 9C and the first layer $14B_1$ of the yoke portion layer 14B serving as the base of the layer 14Ae are flattened by polishing. This allows the end of the pole portion layer 14A closer to the gap layer 9 to be flat in the medium facing surface ABS. If the layer 14Ae is formed by sputtering, a good uniformity in thickness of the layer 14Ae as deposited can be obtained, so that the end of the pole portion layer 14A farther from the gap layer 9 can also be made flat in the medium facing surface ABS. The magnetic field produced from the pole portion layer 14A in the medium facing surface ABS can thereby be made uniform in the direction intersecting the track. Consequently, it is possible to prevent the bit pattern of the recording medium from being distorted, and to thereby improve the linear recording density.

Furthermore, in this embodiment, if the top surface of the layer 14Ae is flattened by polishing after the step of forming the layer 14Ae, the end of the pole portion layer 14A farther from the gap layer 9 can be completely made flat in the medium facing surface ABS. This allows the magnetic field produced from the pole portion layer 14A in the medium facing surface ABS to be made uniform in the direction intersecting the track. Consequently, it is possible to prevent the bit pattern of the recording medium from being distorted, and to thereby improve the linear recording density.

Furthermore, in this embodiment, the step of forming the pole portion layer 14A includes, after the step of forming the layer 14Ae, the steps of: forming the non-magnetic layer 15e on the layer 14Ae; and forming the mask 32 corresponding to the shape of the pole portion layer 14A on the non-magnetic layer 15e. In the step of etching the layer 14Ae, the mask 32 may be used to etch the non-magnetic layer 15e and the layer 14Ae. In this case, it is possible to define the outer shape of the pole portion layer 14A with the top surface of the layer 14Ae being protected by the non-magnetic layer 15e, which makes it possible to maintain the flatness of the end of the pole portion layer 14A farther from the gap layer 9.

Furthermore, in the step of forming the mask 32, the resist frame 31 having a gap portion corresponding to the shape of the pole portion layer 14A may be formed on the non-magnetic layer 15e, so as to form the mask 32 inside the gap portion of the resist frame 31. In this case, it is possible to form the mask 32 to have a better resistance to dry etching compared to the case where the mask 32 is formed using a resist. As a result, even when the pole portion layer 14A is made of a material that has a good resistance to dry etching, it is possible to define the outer shape of the pole portion layer 14A by dry etching using the mask 32.

In this embodiment, the second layer $14B_2$ of the yoke portion layer 14B may be formed by electroplating. In this case, the second layer $14B_2$ can be easily formed into a shape that well follows the shape of the base thereof.

The step of forming the second layer $14B_2$ of the yoke portion layer 14B may include the steps of: forming the resist cover 33 for covering part of the pole portion layer 14A located near the medium facing surface ABS; forming the electrode layer 34 for electroplating on the resist cover 33, the pole portion layer 14A (and the non-magnetic layer 15) and the first layer $14B_1$ of the yoke portion layer 14B; and forming the second layer $14B_2$ by electroplating using the electrode layer 34. In this case, it is possible to prevent the electrode layer from adhering to and remaining on the side surfaces of part of the pole portion layer 14A located near the medium facing surface ABS, and to thereby prevents the track width from being expanded due to the electrode layer adhering thereto or remaining thereon. When removing the electrode layer by dry etching, it is also possible to prevent the degradation in reliability of the thin-film magnetic head caused by the etched material adhering to or remaining on the side surfaces of part of the pole portion layer 14A located near the medium facing surface ABS.

[Second Embodiment]

Figure 23:
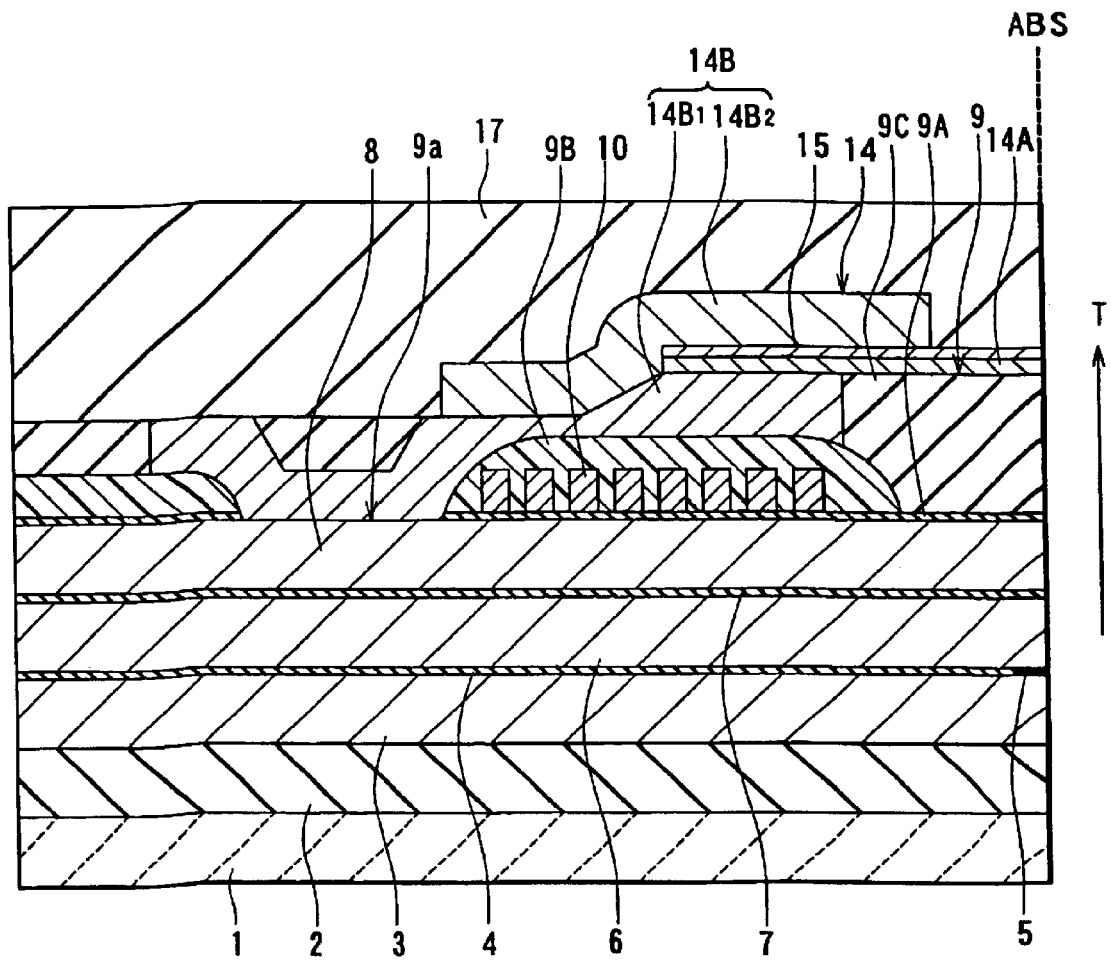
FIG. 23 is a cross-sectional view illustrating a structure of a thin-film magnetic head according to a second embodiment of the invention.
Figure 24:
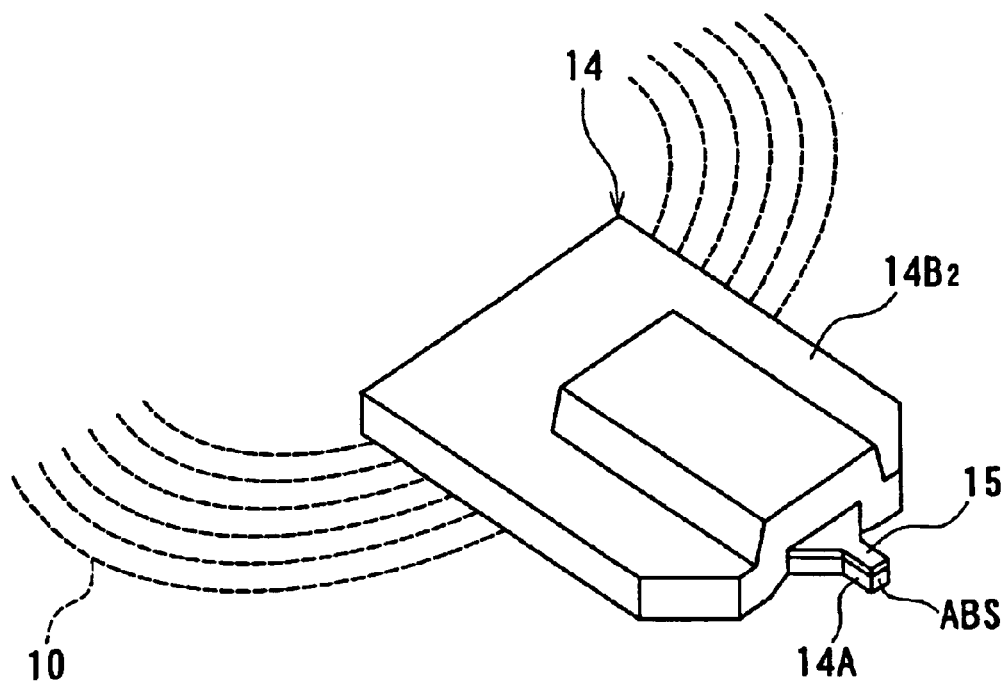
FIG. 24 is a perspective view illustrating the main part of the thin-film magnetic head shown in FIG. 23.

A thin-film magnetic head according to a second embodiment of the invention will now be explained with reference to FIGS. 23 and 24. FIG. 23 is a cross-sectional view illustrating the structure of the thin-film magnetic head of this embodiment. FIG. 23 shows a cross section orthogonal to the medium facing surface and the surface of the substrate. In addition, the arrow indicated by symbol T in FIG. 23 shows the traveling direction of a recording medium. FIG. 24 is a perspective view illustrating the main part of the thin-film magnetic head shown in FIG. 23.

In this embodiment, the first layer $14B_1$ of the yoke portion layer 14B is smaller in thickness than in the first embodiment. The thickness of the first layer $14B_1$ at the position of the contact hole 9a is equal to or less than the total thickness of the insulating layers 9A, 9B. The first layer $14B_1$ preferably has a thickness of 1 μm or more at the position of the contact hole 9a.

In this embodiment, the first layer $14B_1$ of the yoke portion layer 14B extends from the portion magnetically coupled to the first magnetic layer 8 by 2 μm or more in a direction opposite to the medium facing surface. In this embodiment, the first layer $14B_1$ of the yoke portion layer 14B preferably extends further in both directions of the width.

Furthermore, in this embodiment the end of the second layer $14B_2$ of the yoke portion layer 14B opposite to the medium facing surface ABS is located closer to the medium facing surface ABS than the portion where the first layer $14B_1$ and the first magnetic layer 8 are magnetically coupled to each other. However, the end of the second layer $14B_2$ opposite to the medium facing surface ABS is located farther from the medium facing surface ABS than the end of the pole portion layer 14A opposite to the medium facing surface ABS, and preferably located away from the medium facing surface ABS by 10 μm or more.

Now, referring to FIGS. 25 to 36, a method of manufacturing the thin-film magnetic head according to this embodiment is explained below.

The method of manufacturing the thin-film magnetic head of this embodiment employs the same steps as those of the first embodiment up to the step of forming the thin-film coil 10 and the insulating layer 9B on the insulating layer 9A, as shown in FIG. 10.

Figure 25:
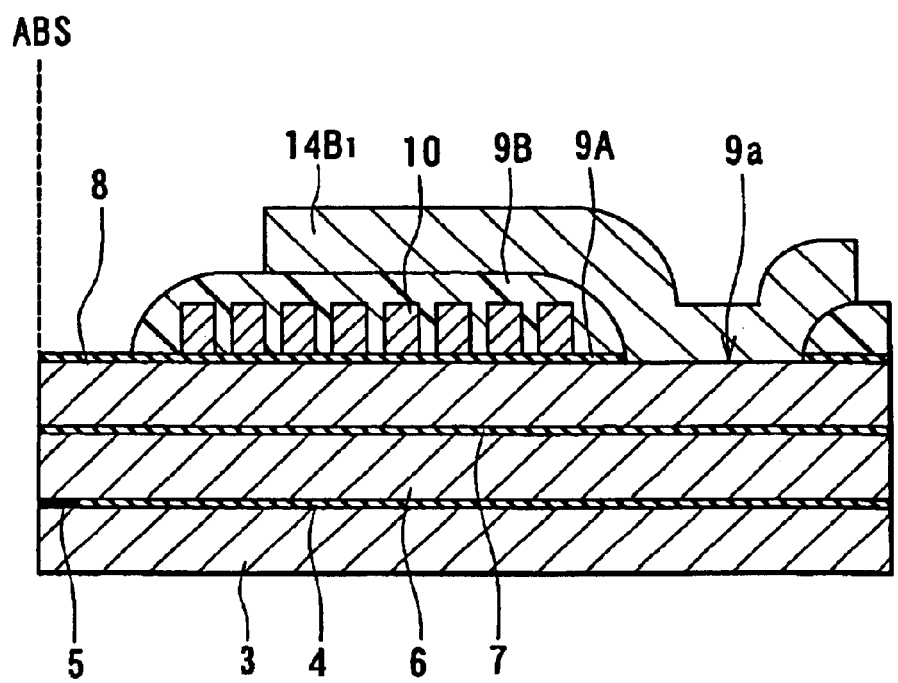
FIG. 25 is a cross-sectional view illustrating a step of a method of manufacturing the thin-film magnetic head according to the second embodiment of the invention.

In this embodiment, as shown in FIG. 25, the first layer $14B_1$ of the yoke portion layer 14B is formed on the first magnetic layer 8 and the insulating layer 9B with a known photolithography technique and a known deposition technique (e.g., electroplating). At this stage, for example, the first layer $14B_1$ is shaped to have a thickness of 1 to 4 μm, a depth of 2 to 10 μm, and a width of 5 to 20 μm.

Figure 26:
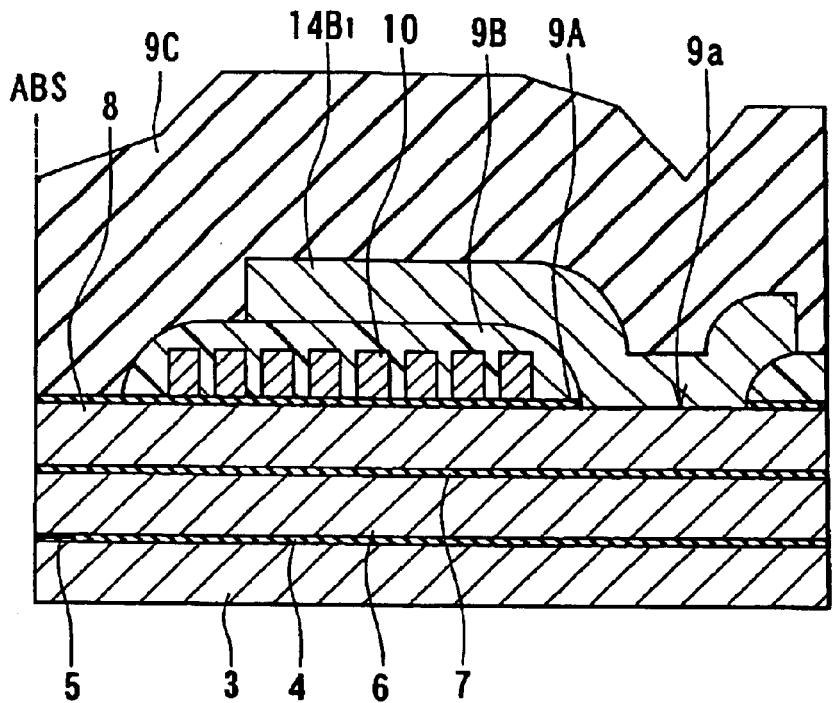
FIG. 26 is a cross-sectional view illustrating a step that follows FIG. 25.

Then, as shown in FIG. 26, the insulating layer 9C is formed by sputtering, so as to cover the insulating layer 9A, the insulating layer 9B, and the first layer $14B_1$ of the yoke portion layer 14B. At this stage, the insulating layer 9C has a thickness equal to or greater than that of the first layer $14B_1$.

Figure 27:
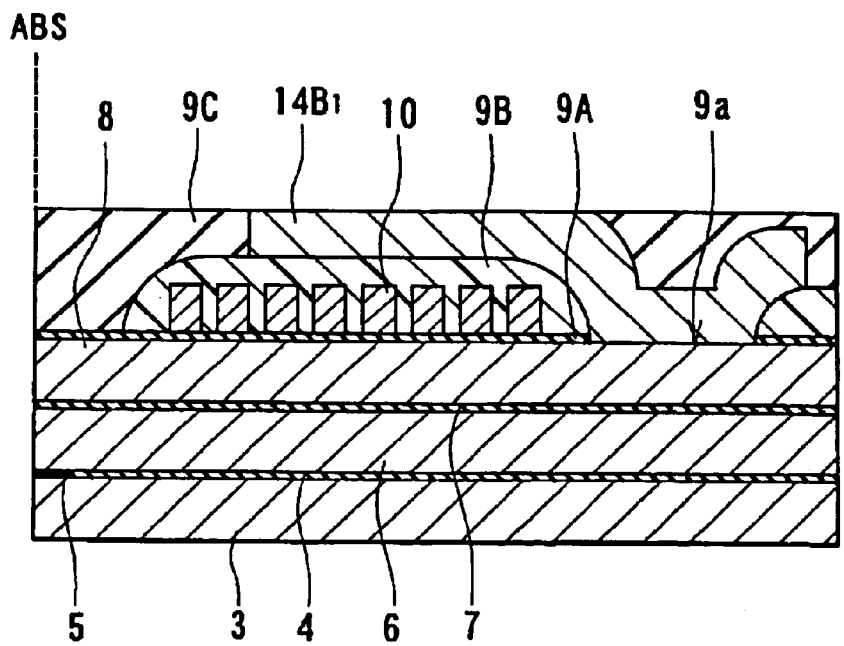
FIG. 27 is a cross-sectional view illustrating a step that follows FIG. 26.

Then, as shown in FIG. 27, the surface of the insulating layer 9C is polished by chemical mechanical polishing, for example, so that the first layer $14B_1$ of the yoke portion layer 14B is exposed and the thickness of the insulating layer 9C becomes equal to the predetermined recording gap length, and the top surfaces of the insulating layer 9C and the first layer $14B_1$ are flattened. At this stage, the distance from the top surface of the first magnetic layer 8 to the top surface of the insulating layer 9C is 3 to 6 μm, for example.

Figure 28:
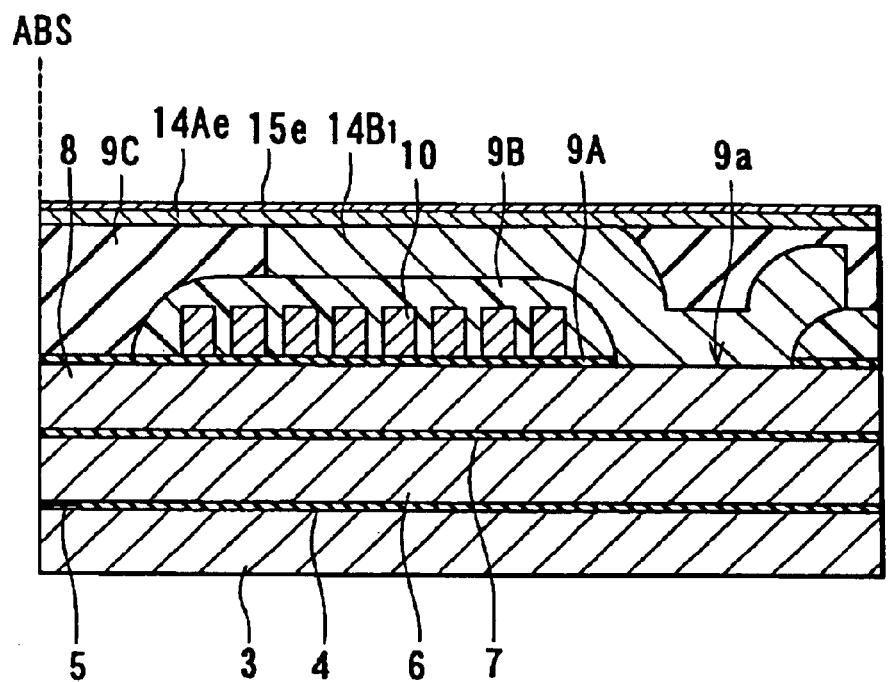
FIG. 28 is a cross-sectional view illustrating a step that follows FIG. 27.

Then, as shown in FIG. 28, on the insulating layer 9C and the first layer $14B_1$, the layer 14Ae to be etched is formed of a material for forming the pole portion layer 14A of the second magnetic layer 14. The layer 14Ae preferably has a thickness of 0.1 to 0.8 μm, and more preferably a thickness of 0.3 to 0.8 μm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, the non-magnetic layer 15e is formed on the layer 14Ae. The non-magnetic layer 15e is preferably equal to or less than 0.5 μm in thickness.

Then, although not shown, an electrode layer for electroplating is formed by sputtering on the non-magnetic layer 15e. The electrode layer is equal to or less than 0.1 μm in thickness and made of an iron-nickel alloy, for example.

Figure 29:
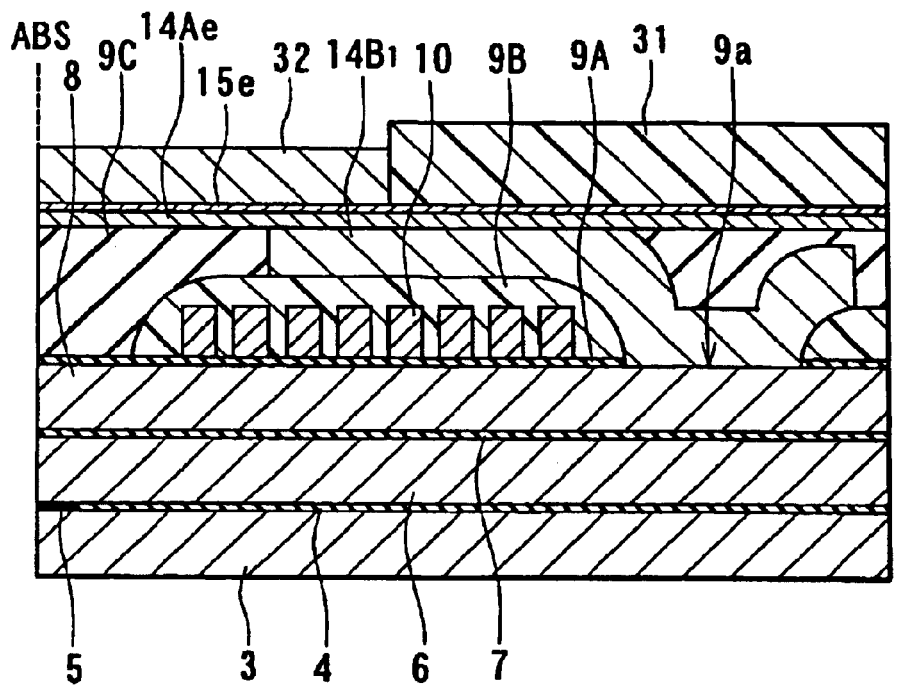
FIG. 29 is a cross-sectional view illustrating a step that follows FIG. 28.

Then, as shown in FIG. 29, the resist frame 31, which has a gap portion corresponding to the shape of the pole portion layer 14A, is formed of a photoresist on the aforementioned electrode layer by photolithography. Using the resist frame 31, a plating film that serves as the mask 32 corresponding to the shape of the pole portion layer 14A is formed on the aforementioned electrode layer by electroplating (frame plating). This plating film is 1 to 4 μm in thickness and made of an iron-nickel alloy, for example. The resist frame 31 is then removed.

Figure 30:
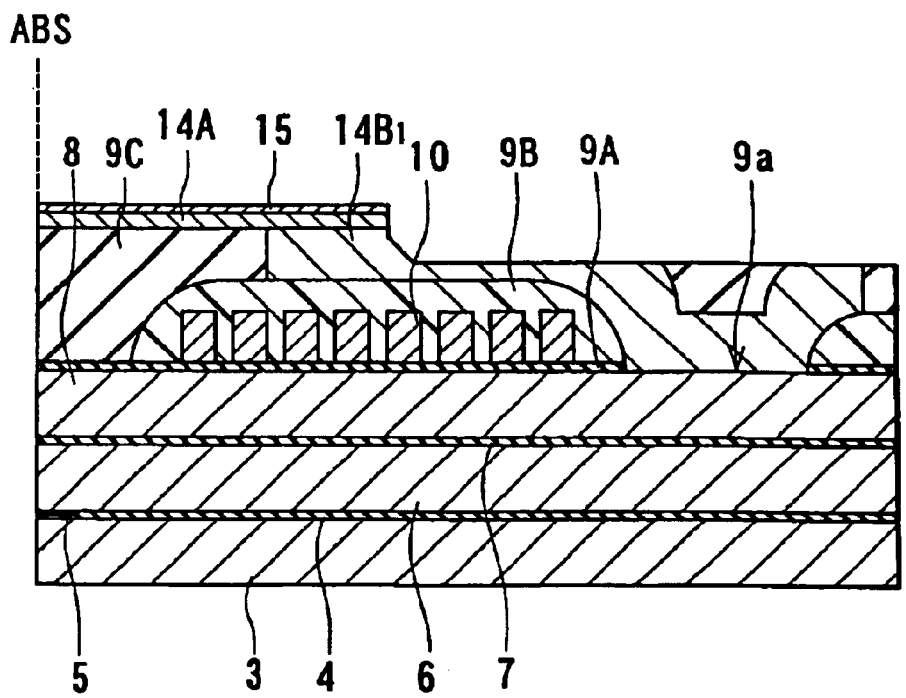
FIG. 30 is a cross-sectional view illustrating a step that follows FIG. 29.

Then, as shown in FIG. 30, using the mask 32, the non-magnetic layer 15e and the layer 14Ae are etched by dry etching such as ion milling to form the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like. Through the aforementioned etching, the non-magnetic layer 15 and the pole portion layer 14A are formed and the first layer $14B_1$ of the yoke portion layer 14B is exposed.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to form the non-magnetic layer 15 and the pole portion layer 14A and to expose the first layer $14B_1$ of the yoke portion layer 14B. Thereafter, the patterned resist may be removed.

Figure 31:
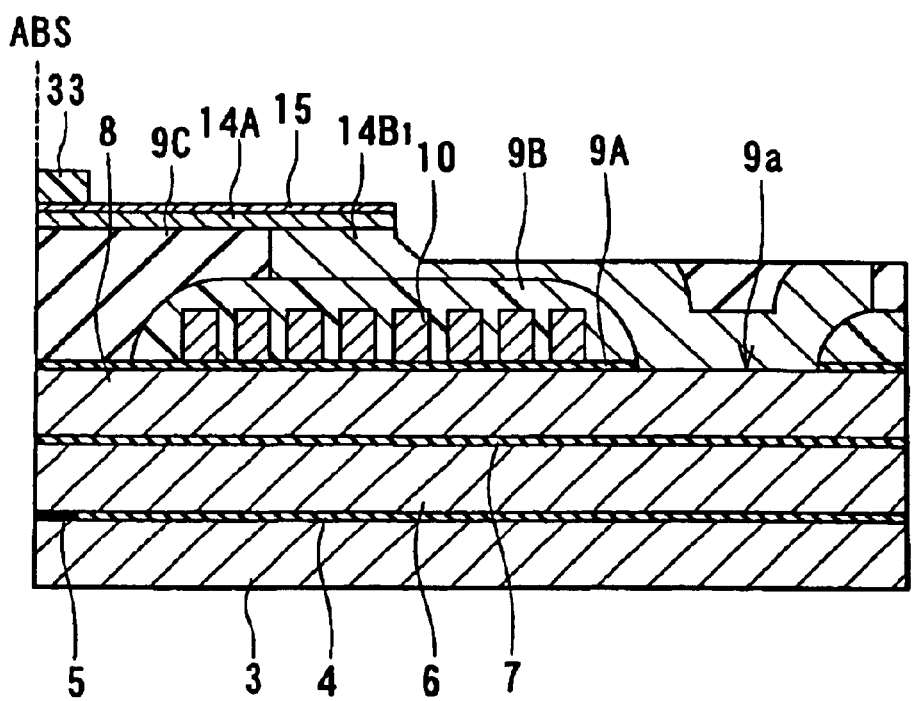
FIG. 31 is a cross-sectional view illustrating a step that follows FIG. 30.

Then, as shown in FIG. 31, the resist cover 33 is formed of a photoresist by photolithography to cover portions of the pole portion layer 14A and non-magnetic layer 15 located near the medium facing surface ABS. The resist cover 33 is preferably formed to have a thickness equal to or less than that of a frame for forming the yoke portion layer to be described later.

Figure 32:
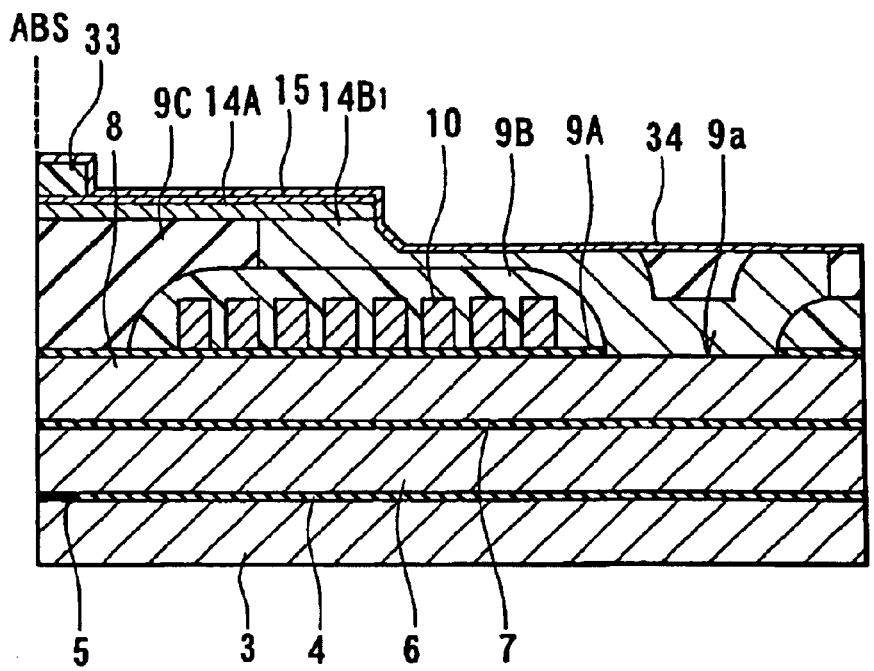
FIG. 32 is a cross-sectional view illustrating a step that follows FIG. 31.
Figure 33:
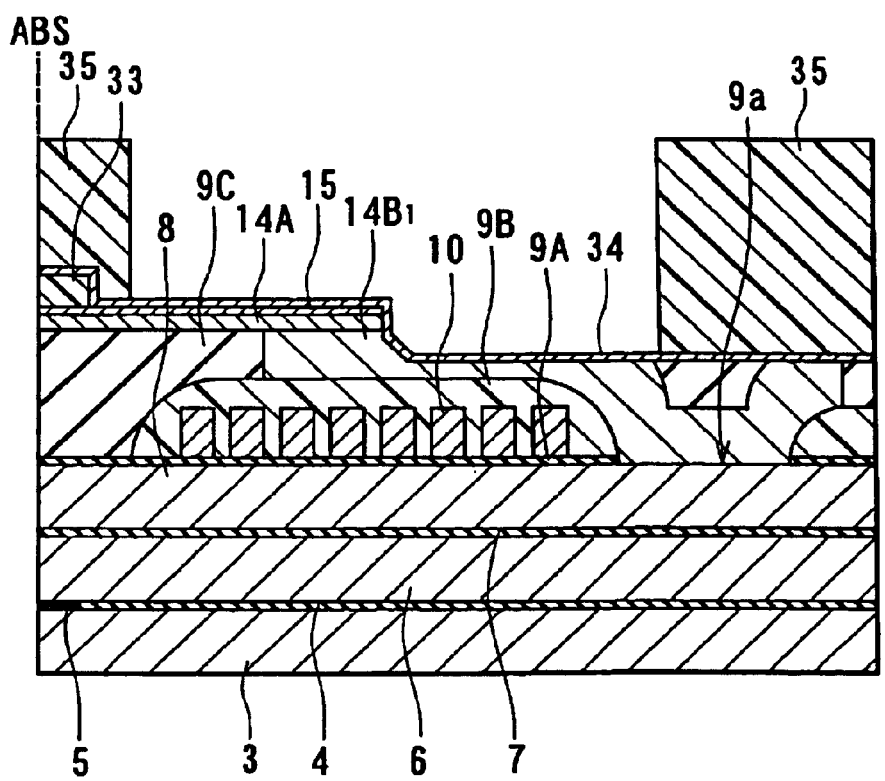
FIG. 33 is a cross-sectional view illustrating a step that follows FIG. 32.

Then, as shown in FIG. 32, the electrode layer 34 for electroplating is formed by sputtering on the resist cover 33, the pole portion layer 14A (and the non-magnetic layer 15), and the first layer $14B_1$ of the yoke portion layer 14B. The electrode layer 34 may have a thickness of 0.1 μm or less, and may be formed of an iron-nickel alloy, with Ti (titanium) deposited to underlie the electrode layer 34. 158 Then, as shown in FIG. 33, the resist frame 35 having a gap portion corresponding to the shape of the second layer $14B_2$ of the yoke portion layer 14B is formed of a photoresist on the electrode layer 34.

Figure 34:
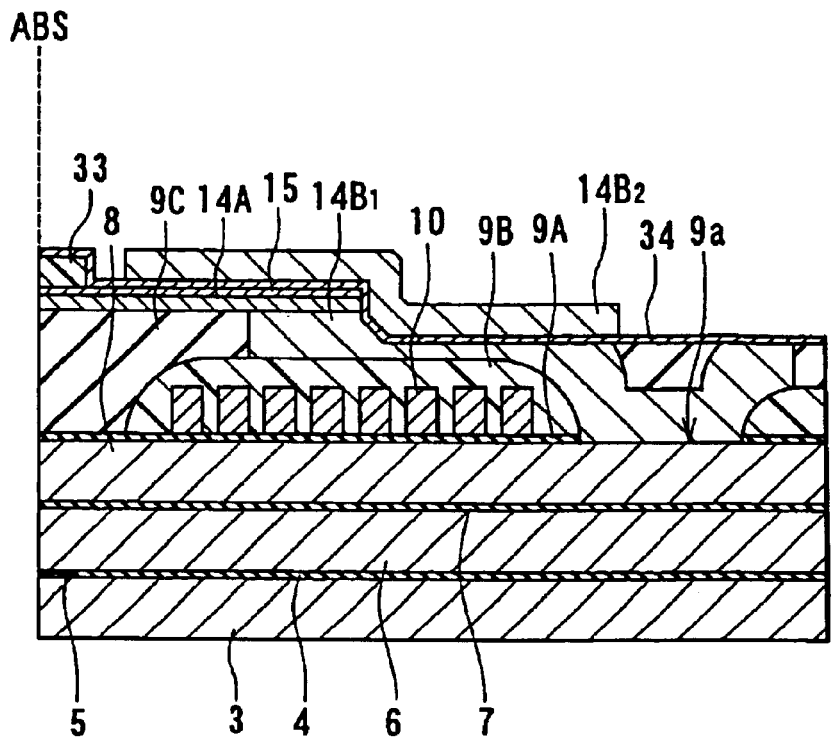
FIG. 34 is a cross-sectional view illustrating a step that follows FIG. 33.

Then, as shown in FIG. 34, using the resist frame 35, the second layer $14B_2$ of the yoke portion layer 14B is formed on the electrode layer 34 by electroplating (frame plating). The resist frame 35 is then removed.

Figure 35:
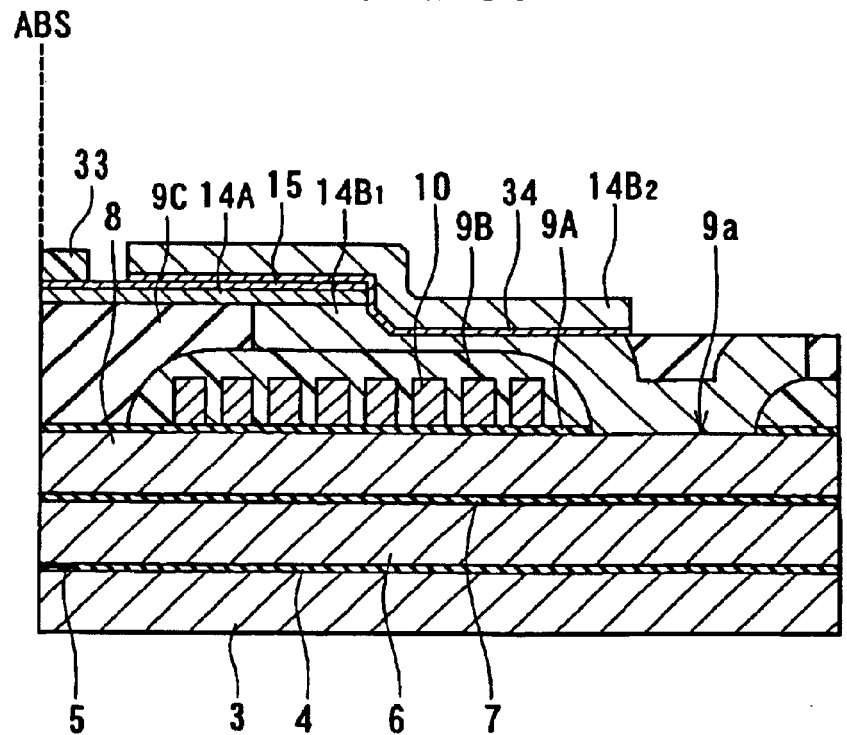
FIG. 35 is a cross-sectional view illustrating a step that follows FIG. 34.

Then, as shown in FIG. 35, the electrode layer 34 except for the portion underlying the second layer $14B_2$ of the yoke portion layer 14B is removed by dry etching.

Figure 36:
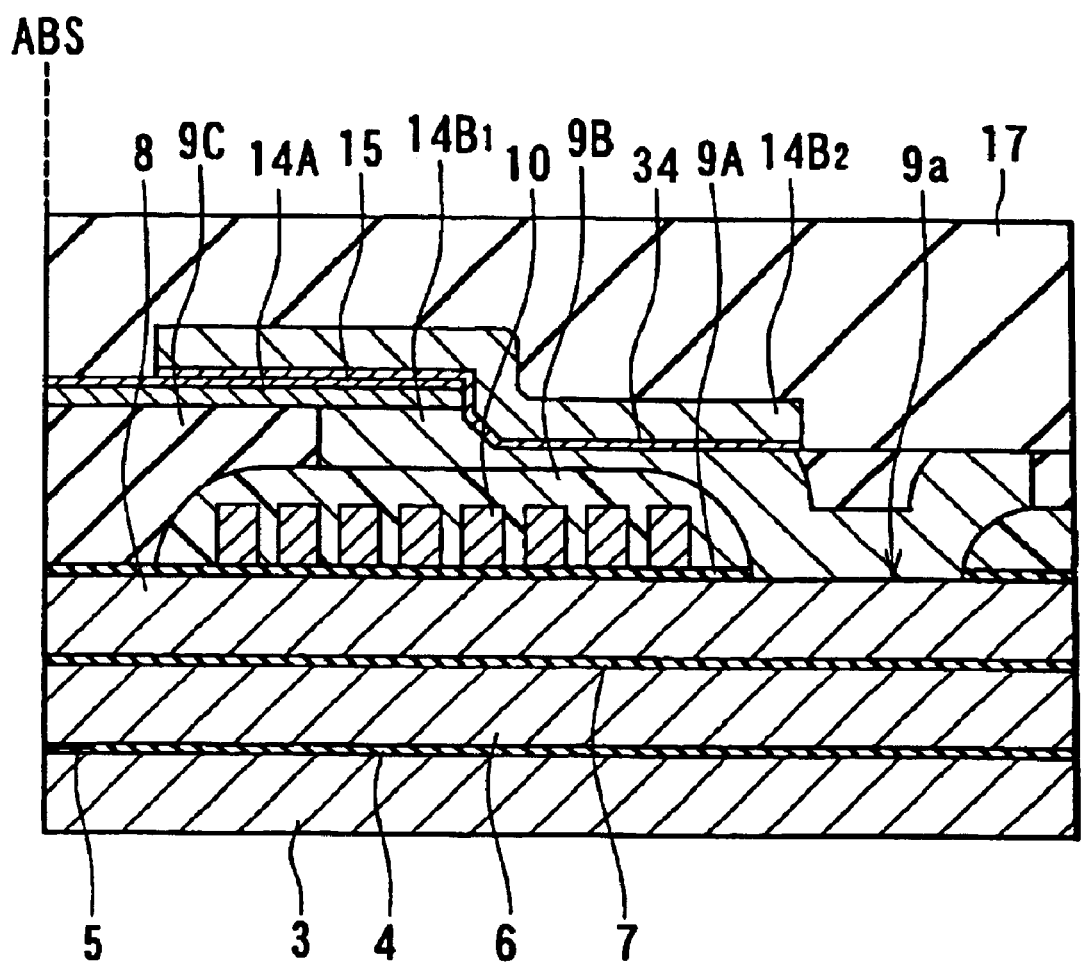
FIG. 36 is a cross-sectional view illustrating a step that follows FIG. 35.

Then, as shown in FIG. 36, the resist cover 33 is removed. Subsequently, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

Like the thin-film magnetic head shown in FIG. 6, this embodiment may be modified such that the top shield layer 6 and the non-magnetic layer 7 are eliminated and the first magnetic layer 8 also serves as the top shield layer 6. The remainder of the structure, functions and effects of this embodiment are similar to those of the first embodiment.

[Third Embodiment]

Figure 37:
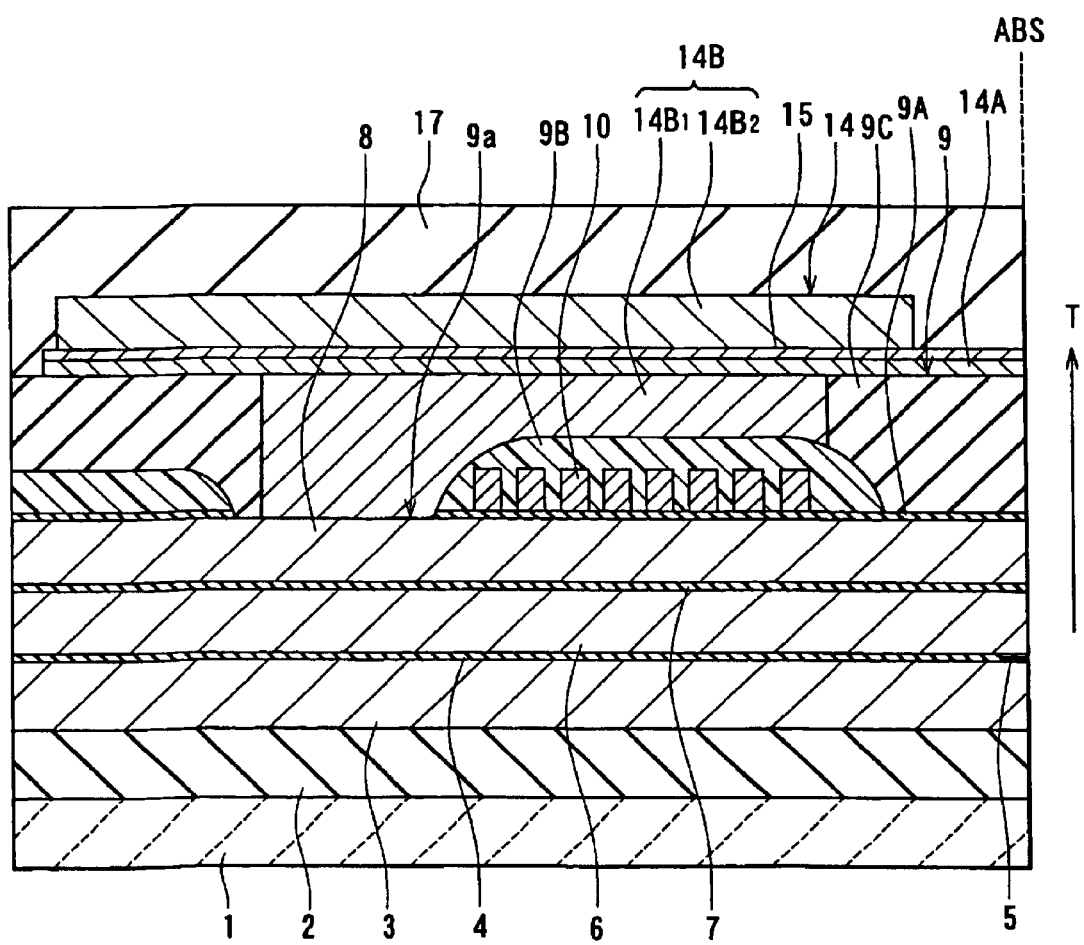
FIG. 37 is a cross-sectional view illustrating a structure of a thin-film magnetic head according to a third embodiment of the invention.
Figure 38:
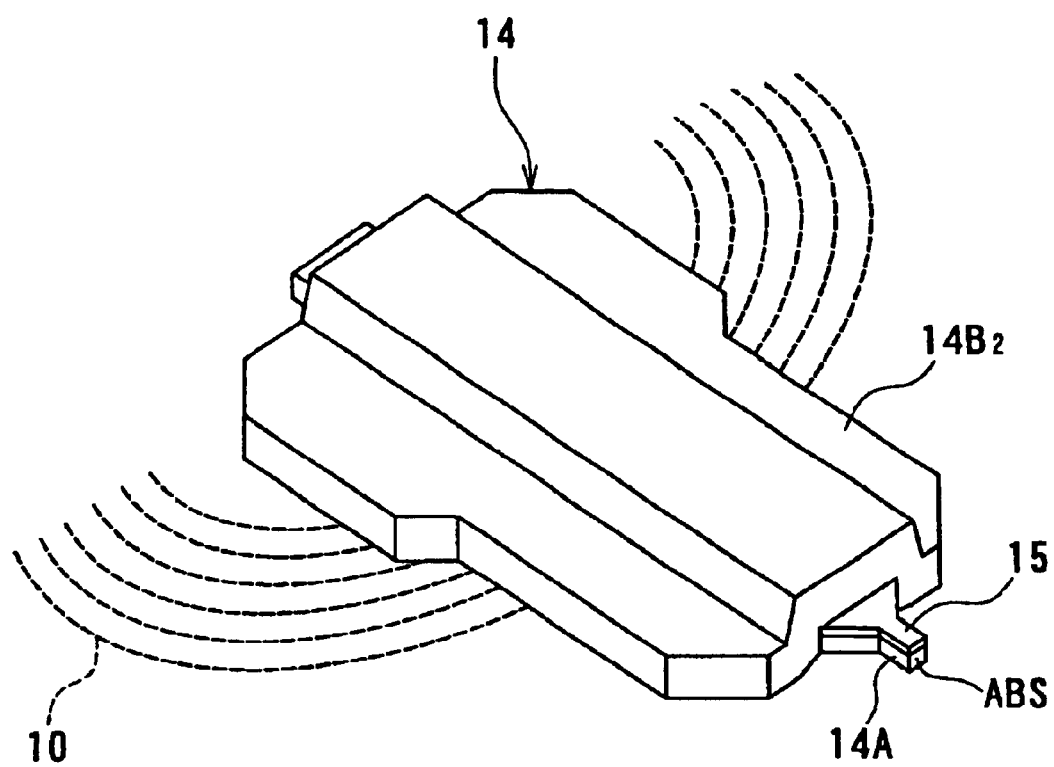
FIG. 38 is a perspective view illustrating the main part of the thin-film magnetic head shown in FIG. 37.

A thin-film magnetic head according to a third embodiment of the invention will now be explained with reference to FIGS. 37 to 38. FIG. 37 is a cross-sectional view illustrating the structure of the thin-film magnetic head of this embodiment. FIG. 37 shows a cross section orthogonal to the medium facing surface and the surface of the substrate. In addition, the arrow indicated by symbol T in FIG. 37 shows the traveling direction of a recording medium. FIG. 38 is a perspective view illustrating the main part of the thin-film magnetic head shown in FIG. 37.

In this embodiment, the top surfaces of the first layer $14B_1$ of the yoke portion layer 14B and the gap layer 9 are flattened together so as to form one plane. In this embodiment, the pole portion layer 14A is formed on the flattened first layer $14B_1$ and gap layer 9, and the non-magnetic layer 15 is formed on the pole portion layer 14A. In this embodiment, the end of each of the pole portion layer 14A and non-magnetic layer 15 opposite to the medium facing surface ABS is located farther from the medium facing surface ABS than the portion where the first magnetic layer 8 and the first layer $14B_1$ are magnetically coupled to each other.

In addition, the end of the second layer $14B_2$ of the yoke portion layer 14B opposite to the medium facing surface ABS reaches near the end of each of the pole portion layer 14A and non-magnetic layer 15 opposite to the medium facing surface ABS. In this embodiment, the second layer $14B_2$ is not in contact with the rear end of the pole portion layer 14A, but is in contact with both side surfaces of the pole portion layer 14A in the width direction. The second layer $14B_2$ is magnetically connected to the top surface of the pole portion layer 14A via the non-magnetic layer 15. Therefore, in this embodiment, the yoke portion layer 14B is in direct contact with and magnetically connected to the pole portion layer 14A at the surface of the pole portion layer 14A closer to the gap layer 9 and both side surfaces of the pole portion layer 14A in the width direction, and is also magnetically connected to the top surface of the pole portion layer 14A via the non-magnetic layer 15.

The method of manufacturing the thin-film magnetic head according to this embodiment is the same as that of the first embodiment.

Like the thin-film magnetic head shown in FIG. 6, this embodiment may be modified such that the top shield layer 6 and the non-magnetic layer 7 are eliminated and the first magnetic layer 8 also serves as the top shield layer 6. The remainder of the structure, functions and effects of this embodiment are similar to those of the first embodiment.

[Fourth Embodiment]

Figure 39:
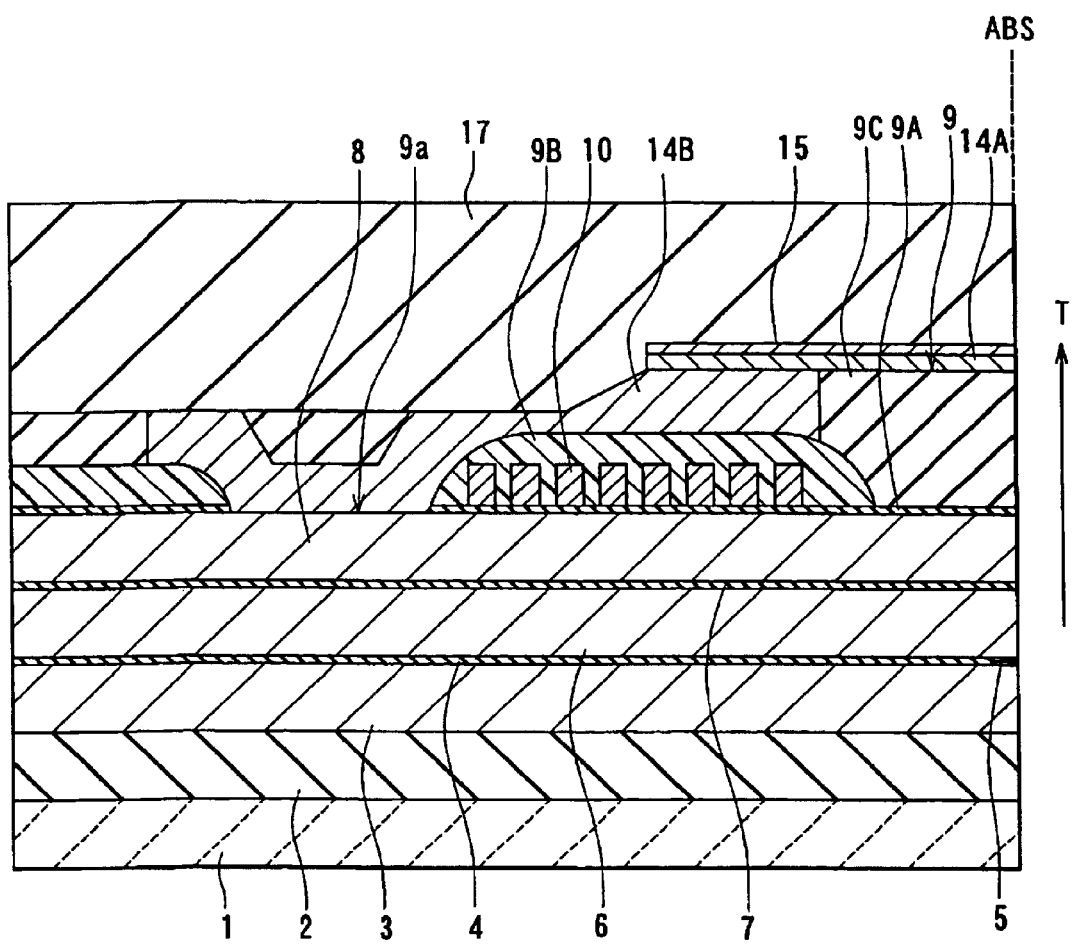
FIG. 39 is a cross-sectional view illustrating a structure of a thin-film magnetic head according to a fourth embodiment of the invention.

A thin-film magnetic head according to a fourth embodiment of the invention will now be explained with reference to FIGS. 39 to 41. FIG. 39 is a cross-sectional view illustrating the structure of the thin-film magnetic head of this embodiment. FIG. 39 shows a cross section orthogonal to the medium facing surface and the surface of the substrate. In addition, the arrow indicated by symbol T in FIG. 39 shows the traveling direction of a recording medium. FIG. 40 is a perspective view illustrating the main part of the thin-film magnetic head shown in FIG. 39. FIG. 41 is a perspective view illustrating the main part of a modified example of the thin-film magnetic head shown in FIG. 39. In FIGS. 40 and 41, the gap layer 9 and the thin-film coil 10 are not shown.

The thin-film magnetic head of this embodiment is configured such that the second layer $14B_2$ of the yoke portion layer 14B of the second embodiment is eliminated. That is, the yoke portion layer 14B of this embodiment has a shape similar to that of the first layer $14B_1$ of the yoke portion layer 14B of the second embodiment. Therefore, in this embodiment, the yoke portion layer 14B is magnetically connected to the pole portion layer 14A at the surface of the pole portion layer 14A closer to the gap layer 9. At least part of the portion where the yoke portion layer 14B and the pole portion layer 14A are connected to each other is located closer to the medium facing surface ABS than the portion where the first magnetic layer 8 and the yoke portion layer 14B are connected to each other.

The method of manufacturing the thin-film magnetic head according to this embodiment eliminates the step of forming the second layer $14B_2$ in the second embodiment.

In this embodiment, of the surface of the yoke portion layer 14B farther from the first magnetic layer 8, a portion that is not in contact with the pole portion layer 14A is located closer to the first magnetic layer 8 than the surface of the pole portion layer 14A adjacent to the gap layer 9. In addition, at least part of the surface of the yoke portion layer 14B farther from the first magnetic layer 8 gradually approaches the first magnetic layer 8 as the distance from the pole portion layer 14A increases. The shape of the surface of the yoke portion layer 14B farther from the first magnetic layer 8 as described above is defined by the etching in forming the pole portion layer 14A.

FIG. 40 shows the case where the yoke portion layer 14B has the same shape as that of the first layer $14B_1$ of the yoke portion layer 14B in the second embodiment. In contrast to this, FIG. 41 shows the case where the insulating layer 9B is made greater in thickness than in the second embodiment and the thickness of part of the yoke portion layer 14B located near the medium facing surface ABS is made smaller than that in FIG. 40.

In this embodiment, by forming the yoke portion layer 14B to have such a shape as described above, it becomes possible to magnetically connect the pole portion layer 14A to the first magnetic layer 8 in a short distance with the yoke portion layer 14B, without necessitating an excessive increase in volume of the yoke portion layer 14B.

Furthermore, in this embodiment the yoke portion layer 14B is made up of a single layer, which simplifies the structure and manufacture of the thin-film magnetic head as compared with the other embodiments.

Like the thin-film magnetic head shown in FIG. 6, this embodiment may be modified such that the top shield layer 6 and the non-magnetic layer 7 are eliminated and the first magnetic layer 8 also serves as the top shield layer 6. The remainder of the structure, functions and effects of this embodiment are similar to those of the second embodiment.

The present invention is not limited to the foregoing embodiments but may be practiced in still other ways. In FIG. 1, for example, the end of the second layer $14B_2$ of the yoke portion layer 14B closer to the medium facing surface ABS is located closer to the medium facing surface ABS than the end of the first layer $14B_1$ closer to the medium facing surface ABS. However, the positional relationship between those ends may be reversed, or those ends may be located at the same distance from the medium facing surface ABS.

In the foregoing, a process has been described, which includes the steps of, after the step of forming the layer to be etched, forming the non-magnetic layer on the layer to be etched, forming the mask corresponding to a shape of the pole portion layer on the non-magnetic layer, and defining an outer shape of the pole portion layer by etching the non-magnetic layer and the layer to be etched, by using the mask. This process is usable not only for the thin-film magnetic head of the present invention but also for a thin-film magnetic head having a different shape so long as it is preferred in the thin-film magnetic head to maintain the flatness of the end of the pole portion layer farther from the gap layer.

As described above, in the first thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and both side surfaces of the pole portion layer in the width direction. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer and at both side surfaces of the pole portion layer in the width direction, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the first thin-film magnetic head of the invention, the first magnetic layer may be disposed on a trailing side in the traveling direction of the recording medium, and the second magnetic layer may be disposed on a leading side in the traveling direction of the recording medium. In this case, it is possible to form a magnetization pattern of a higher density on the recording medium, thereby improving the linear recording density.

In the first thin-film magnetic head of the invention, the yoke portion layer may include: a first layer that is in contact with and magnetically connected to the first magnetic layer and the surface of the pole portion layer closer to the gap layer; and a second layer that is in contact with and magnetically connected to the first layer and both the side surfaces of the pole portion layer in the width direction. In this case, it becomes easier to form the yoke portion layer.

In the first thin-film magnetic head of the invention, the second layer of the yoke portion layer may be further magnetically connected to a surface of the pole portion layer that is farther from the gap layer. In this case, it is possible to introduce a magnetic flux into the pole portion layer from the second layer of the yoke portion layer through the surface of the pole portion layer farther from the gap layer, and it is thereby possible to improve electromagnetic conversion efficiency.

In the first thin-film magnetic head of the invention, the yoke portion layer may be magnetically connected to the pole portion layer further at an end surface of the pole portion layer that is farther from the medium facing surface.

In this case, it is possible to still further prevent the saturation of the magnetic flux halfway through the second magnetic layer.

In the first thin-film magnetic head of the invention, the yoke portion layer may include: a first layer that is in contact with and magnetically connected to the first magnetic layer and the surface of the pole portion layer that is closer to the gap layer; and a second layer that is in contact with and magnetically connected to the first layer, the end surface of the pole portion layer that is farther from the medium facing surface, and both the side surfaces of the pole portion layer in the width direction. In this case, it becomes easier to form the yoke portion layer.

In the first thin-film magnetic head of the invention, the second layer of the yoke portion layer may be further magnetically connected to a surface of the pole portion layer that is farther from the gap layer. In this case, it is possible to introduce a magnetic flux into the pole portion layer from the second layer of the yoke portion layer through the surface of the pole portion layer farther from the gap layer, and it is thereby possible to improve electromagnetic conversion efficiency.

In the first thin-film magnetic head of the invention, an end of the yoke portion layer that is closer to the medium facing surface may be disposed at a distance from the medium facing surface. In this case, it is possible to prevent the magnetic field, generated from the end of the yoke portion layer closer to the medium facing surface, from causing writing of information onto the recording medium.

In the first thin-film magnetic head of the invention, a portion of the pole portion layer that is in contact with the yoke portion layer may have a width greater than the width of the pole portion layer measured in the medium facing surface. In this case, it is possible to prevent saturation of magnetic flux at the portion of the pole portion layer that is in contact with the yoke portion layer, and to thereby efficiently introduce the magnetic flux from the yoke portion layer into the pole portion layer. In addition, the portion of the pole portion layer exposed in the medium facing surface can be made smaller in area, which makes it possible to increase the intensity of magnetic field applied to the recording medium.

In the first thin-film magnetic head of the invention, an end surface of the pole portion layer that is farther from the medium facing surface may be located at a distance of 2 $\mu$m or more from the medium facing surface. In this case, it is possible to prevent saturation of magnetic flux at the portion of the pole portion layer that is in contact with the yoke portion layer, without increasing the thickness or width of the pole portion layer. Consequently, it is possible to introduce the magnetic flux efficiently from the yoke portion layer into the pole portion layer.

The first thin-film magnetic head of the invention may further comprise a non-magnetic layer that is in contact with a surface of the pole portion layer that is farther from the gap layer. In this case, it is possible to prevent the surface of the pole portion layer farther from the gap layer from being damaged when forming the pole portion layer by dry etching or when forming the yoke portion layer by electroplating, and to thereby make the surface flat.

In the first thin-film magnetic head of the invention, the non-magnetic layer may be exposed in the medium facing surface. In this case, the end of the pole portion layer farther from the gap layer can be kept flat in the medium facing surface. This allows the magnetic field generated from the pole portion layer in the medium facing surface to be made uniform in the direction intersecting the track. Consequently, it is possible to prevent the bit pattern of the recording medium from being distorted in shape, and to thereby improve the linear recording density.

In the first thin-film magnetic head of the invention, part of the yoke portion layer may be adjacent to the surface of the pole portion layer farther from the gap layer via the non-magnetic layer, and may be magnetically connected to the pole portion layer via the non-magnetic layer. In this case, it is possible to introduce magnetic flux from the yoke portion layer to the medium-facing-surface side of the pole portion layer via the non-magnetic layer, through the surface of the pole portion layer farther from the gap layer, too.

In the first thin-film magnetic head of the invention, the non-magnetic layer may be made of a material having a lower etching rate for dry etching than that of a material forming the pole portion layer, and than that of a material forming a portion of the gap layer, the portion being in contact with the pole portion layer. In this case, it is possible to prevent the surface of the pole portion layer farther from the gap layer from being damaged when forming the pole portion layer by dry etching.

In the first thin-film magnetic head of the invention, the at least part of the thin-film coil may be located closer to the first magnetic layer than a midpoint between the first magnetic layer and the pole portion layer of the second magnetic layer. In this case, the magnetic field produced by the thin-film coil can be efficiently absorbed by the first magnetic layer.

In the first thin-film magnetic head of the invention, the gap layer may comprise: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface. In this case, it is possible to completely fill the spaces between the windings of the thin-film coil with a non-magnetic material and to thereby increase the reliability of the gap layer.

The first thin-film magnetic head of the invention may further comprise a magnetoresistive element as a read element. In this case, it is possible to improve the read performance as compared with the case where reading is performed by using an induction-type electromagnetic transducer.

The first thin-film magnetic head of the invention may be employed for a vertical magnetic recording scheme. In this case, it is possible to make the thin-film magnetic head impervious to heat fluctuations of the recording medium, and to thereby increase the linear recording density.

In the first method of manufacturing a thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and both side surfaces of the pole portion layer in the width direction. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer and at both side surfaces of the pole portion layer in the width direction, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the first method of manufacturing a thin-film magnetic head of the invention, the yoke portion layer may be magnetically connected to the pole portion layer further at an end surface of the pole portion layer that is farther from the medium facing surface. In this case, it is possible to still further prevent the saturation of the magnetic flux halfway through the second magnetic layer.

In the first method of manufacturing a thin-film magnetic head of the invention, the first layer of the yoke portion layer may be formed before the pole portion layer is formed, while the second layer of the yoke portion layer may be formed after the pole portion layer has been formed. In this case, it is made easier to form the yoke portion layer which is magnetically connected to the pole portion layer at least at the surface of the pole portion layer closer to the gap layer and at both side surfaces of the pole portion layer in the width direction. Further, in the first method of manufacturing a thin-film magnetic head of the invention, a layer to be etched, which is made of a material for forming the pole portion layer, may be formed on the flattened first layer and gap layer, and the layer to be etched may be selectively etched by dry etching, thereby defining an outer shape of the pole portion layer. In this case, the end of the pole portion layer closer to the gap layer can be made flat in the medium facing surface. In addition, if the layer to be etched is formed by sputtering, the end of the pole portion layer farther from the gap layer can also be made flat in the medium facing surface. As a result, the magnetic field produced from the pole portion layer in the medium facing surface can be made uniform in the direction intersecting the track. Consequently, it is possible to prevent the bit pattern of the recording medium from being distorted, and to thereby improve the linear recording density.

In the first method of manufacturing a thin-film magnetic head of the invention, the second layer of the yoke portion layer may further be in contact with and magnetically connected to an end surface of the pole portion layer that is farther from the medium facing surface. In this case, it is possible to still further prevent the saturation of the magnetic flux halfway through the second magnetic layer.

In the first method of manufacturing a thin-film magnetic head of the invention, after the step of forming the layer to be etched, the top surface of the layer to be etched may be flattened by polishing. In this case, the end of the pole portion layer farther from the gap layer can be completely made flat in the medium facing surface. This allows the magnetic field produced from the pole portion layer in the medium facing surface to be made uniform in the direction intersecting the track. Consequently, it is possible to prevent the bit pattern of the recording medium from being distorted, and to thereby improve the linear recording density.

In the first method of manufacturing a thin-film magnetic head of the invention, after the step of forming the layer to be etched, the outer shape of the pole portion layer may be defined through the steps of: forming a non-magnetic layer on the layer to be etched; forming a mask corresponding to the shape of the pole portion layer, on the non-magnetic layer; and etching the non-magnetic layer and the layer to be etched, through the use of the mask. In this case, it is possible to define the outer shape of the pole portion layer with the top surface of the layer to be etched being protected by the non-magnetic layer, and it is thereby possible to maintain the flatness of the end of the pole portion layer farther from the gap layer.

In first the method of manufacturing a thin-film magnetic head of the invention, in the step of forming the mask, a resist frame having a gap portion corresponding to the shape of the pole portion layer may be formed on the non-magnetic layer, and the mask may be formed inside the gap portion of the resist frame. In this case, it is possible to form the mask to have a good resistance to dry etching. As a result, even when the pole portion layer is made of a material that has a good resistance to dry etching, it is possible to define the outer shape of the pole portion layer by dry etching using the mask.

In the first method of manufacturing a thin-film magnetic head of the invention, the second layer of the yoke portion layer may be formed by electroplating. In this case, the second layer can be formed easily into a shape that well follows the shape of the base thereof.

In the first method of manufacturing a thin-film magnetic head of the invention, the step of forming the second layer of the yoke portion layer may include the steps of: forming a resist cover for covering a part of the pole portion layer located near the medium facing surface; forming an electrode layer for electroplating on the resist cover, the pole portion layer and the first layer of the yoke portion layer; and forming the second layer of the yoke portion layer by electroplating using the electrode layer. In this case, it is possible to prevent the electrode layer or adherents caused by the etching from remaining on the side surfaces of part of the pole portion layer located near the medium facing surface, and to thereby prevent the track width from being expanded due to the electrode layer remaining thereon. It is also possible to prevent degradation in reliability of the thin-film magnetic head resulting from adherents remaining after the etching.

In the second thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and, a portion where the yoke portion layer and the pole portion layer are connected to each other is located closer to the medium facing surface than a portion where the first magnetic layer and the yoke portion layer are connected to each other. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the second thin-film magnetic head of the invention, of a surface of the yoke portion layer farther from the first magnetic layer, a portion that is not in contact with the pole portion layer may be located closer to the first magnetic layer than a surface of the pole portion layer closer to the gap layer. In this case, it is possible to magnetically connect the pole portion layer to the first magnetic layer in a short distance, without necessitating an excessive increase in volume of the yoke portion layer.

In the second thin-film magnetic head of the invention, at least part of the surface of the yoke portion layer farther from the first magnetic layer may gradually approach the first magnetic layer as the distance from the pole portion layer increases. In this case, it is possible to magnetically connect the pole portion layer to the first magnetic layer in a short distance, without necessitating an excessive increase in volume of the yoke portion layer.

In the second thin-film magnetic head of the invention, the first magnetic layer may be disposed on a trailing side in the traveling direction of the recording medium, and the second magnetic layer may be disposed on a leading side in the traveling direction of the recording medium. In this case, it is possible to form a magnetization pattern of a higher density on the recording medium, thereby improving the linear recording density.

In the second thin-film magnetic head of the invention, an end of the yoke portion layer that is closer to the medium facing surface may be disposed at a distance from the medium facing surface. In this case, it is possible to prevent the magnetic field, generated from the end of the yoke portion layer closer to the medium facing surface, from causing writing of information onto the recording medium.

In the second thin-film magnetic head of the invention, a portion of the pole portion layer that is in contact with the yoke portion layer may have a width greater than the width of the pole portion layer measured in the medium facing surface. In this case, it is possible to prevent saturation of magnetic flux at the portion of the pole portion layer that is in contact with the yoke portion layer, and to thereby efficiently introduce the magnetic flux from the yoke portion layer into the pole portion layer. In addition, the portion of the pole portion layer exposed in the medium facing surface can be made smaller in area, which makes it possible to increase the intensity of magnetic field applied to the recording medium.

In the second thin-film magnetic head of the invention, an end surface of the pole portion layer that is farther from the medium facing surface may be located at a distance of 2 $\mu$m or more from the medium facing surface. In this case, it is possible to prevent saturation of magnetic flux at the portion of the pole portion layer that is in contact with the yoke portion layer, without increasing the thickness or width of the pole portion layer. Consequently, it is possible to introduce the magnetic flux efficiently from the yoke portion layer into the pole portion layer.

The first thin-film magnetic head of the invention may further comprise a non-magnetic layer that is in contact with a surface of the pole portion layer that is farther from the gap layer. In this case, it is possible to prevent the surface of the pole portion layer farther from the gap layer from being damaged when forming the pole portion layer by dry etching or when forming the yoke portion layer by electroplating, and to thereby make the surface flat.

The second thin-film magnetic head of the invention may further comprise a non-magnetic layer that is in contact with a surface of the pole portion layer that is farther from the gap layer. In this case, it is possible to prevent the surface of the pole portion layer farther from the gap layer from being damaged when forming the pole portion layer by dry etching or when forming the yoke portion layer by electroplating, and to thereby make the surface flat.

In the second thin-film magnetic head of the invention, the non-magnetic layer may be exposed in the medium facing surface. In this case, the end of the pole portion layer farther from the gap layer can be kept flat in the medium facing surface. This allows the magnetic field generated from the pole portion layer in the medium facing surface to be made uniform in the direction intersecting the track. Consequently, it is possible to prevent the bit pattern of the recording medium from being distorted in shape, and to thereby improve the linear recording density.

In the second thin-film magnetic head of the invention, the non-magnetic layer may be made of a material having a lower etching rate for dry etching than that of a material forming the pole portion layer, and than that of a material forming a portion of the gap layer, the portion being in contact with the pole portion layer. In this case, it is possible to prevent the surface of the pole portion layer farther from the gap layer from being damaged when forming the pole portion layer by dry etching.

In the second thin-film magnetic head of the invention, the at least part of the thin-film coil may be located closer to the first magnetic layer than a midpoint between the first magnetic layer and the pole portion layer of the second magnetic layer. In this case, the magnetic field produced by the thin-film coil can be efficiently absorbed by the first magnetic layer.

In the second thin-film magnetic head of the invention, the gap layer may comprise: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface. In this case, it is possible to completely fill the spaces between the windings of the thin-film coil with a non-magnetic material and to thereby increase the reliability of the gap layer.

The second thin-film magnetic head of the invention may further comprise a magnetoresistive element as a read element. In this case, it is possible to improve the read performance as compared with the case where reading is performed by using an induction-type electromagnetic transducer.

The second thin-film magnetic head of the invention may be employed for a vertical magnetic recording scheme. In this case, it is possible to make the thin-film magnetic head impervious to heat fluctuations of the recording medium, and to thereby increase the linear recording density.

In the second method of manufacturing a thin-film magnetic head of the invention, the second magnetic layer has the pole portion layer and the yoke portion layer. A surface of the at least part of the thin-film coil, the surface being closer to the second magnetic layer, is located closer to the first magnetic layer than an end of the gap layer is, the end being located in the medium facing surface next to the second magnetic layer. The yoke portion layer is magnetically connected to the pole portion layer at least at a surface of the pole portion layer that is closer to the gap layer, and, a portion where the yoke portion layer and the pole portion layer are connected to each other is located closer to the medium facing surface than a portion where the first magnetic layer and the yoke portion layer are connected to each other. Accordingly, the invention allows the yoke portion layer to form a short magnetic path between a portion thereof magnetically coupled to the first magnetic layer and the pole portion layer, and allows the yoke portion layer to be disposed close to the thin-film coil. Further, in the invention, since the pole portion layer has a saturated magnetic flux density equal to or greater than that of the yoke portion layer, and the yoke portion layer is magnetically connected to the pole portion layer at least at a surface of the pole portion layer closer to the gap layer, it is possible to prevent a magnetic flux from being saturated halfway through the second magnetic layer. Consequently, the invention makes it possible to improve electromagnetic conversion efficiency, to increase the intensity of the magnetic field generated from the magnetic pole portion in the direction perpendicular to the surface of the recording medium, and to reduce a magnetic path length, thereby improving high-frequency characteristics.

In the second method of manufacturing a thin-film magnetic head of the invention, the yoke portion layer may be formed before the pole portion layer is formed. In this case, it is made easier to form the yoke portion layer which is magnetically connected to the pole portion layer at least at the surface of the pole portion layer closer to the gap layer. Further, in the second method of manufacturing a thin-film magnetic head of the invention, a layer to be etched, which is made of a material for forming the pole portion layer, may be formed on the flattened yoke portion layer and gap layer, and the layer to be etched may be selectively etched by dry etching, thereby defining an outer shape of the pole portion layer. In this case, the end of the pole portion layer closer to the gap layer can be made flat in the medium facing surface. In addition, if the layer to be etched is formed by sputtering, the end of the pole portion layer farther from the gap layer can also be made flat in the medium facing surface. As a result, the magnetic field produced from the pole portion layer in the medium facing surface can be made uniform in the direction intersecting the track. Consequently, it is possible to prevent the bit pattern of the recording medium from being distorted, and to thereby improve the linear recording density.

In the second method of manufacturing a thin-film magnetic head of the invention, after the step of forming the layer to be etched, the top surface of the layer to be etched may be flattened by polishing. In this case, the end of the pole portion layer farther from the gap layer can be completely made flat in the medium facing surface. This allows the magnetic field produced from the pole portion layer in the medium facing surface to be made uniform in the direction intersecting the track. Consequently, it is possible to prevent the bit pattern of the recording medium from being distorted, and to thereby improve the linear recording density.

In the second method of manufacturing a thin-film magnetic head of the invention, after the step of forming the layer to be etched, the outer shape of the pole portion layer may be defined through the steps of: forming a non-magnetic layer on the layer to be etched; forming a mask corresponding to the shape of the pole portion layer, on the non-magnetic layer; and etching the non-magnetic layer and the layer to be etched, through the use of the mask. In this case, it is possible to define the outer shape of the pole portion layer with the top surface of the layer to be etched being protected by the non-magnetic layer, and it is thereby possible to maintain the flatness of the end of the pole portion layer farther from the gap layer.

In second the method of manufacturing a thin-film magnetic head of the invention, in the step of forming the mask, a resist frame having a gap portion corresponding to the shape of the pole portion layer may be formed on the non-magnetic layer, and the mask may be formed inside the gap portion of the resist frame. In this case, it is possible to form the mask to have a good resistance to dry etching. As a result, even when the pole portion layer is made of a material that has a good resistance to dry etching, it is possible to define the outer shape of the pole portion layer by dry etching using the mask.

Obviously many modifications and variations of the present invention are possible in the light of the above teachings. It is therefore to be understood that within the range of equivalency of the appended claims the present invention may be carried out otherwise than as specifically described.

What is claimed is:

1. A thin-film magnetic head comprising:
   a medium facing surface that faces toward a recording medium;
   a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;
   a gap layer made of a non-magnetic material and provided between the first and second magnetic layers; and
   a thin-film coil at least a part of which is disposed between the first and second magnetic layers and insulated from the first and second magnetic layers, wherein:
   the at least part of the thin-film coil has a first surface closer to the first magnetic layer and a second surface opposite to the first surface, the second surface being located at a level closer to the first magnetic layer than a level of an end of the gap layer is, the end being located in the medium facing surface next to the second magnetic layer;
   the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other;
   the pole portion layer has a saturated magnetic flux density equal to or greater than that of the yoke portion layer; and
   the yoke portion layer is magnetically connected to the pole portion layer at least at a surface of the pole portion layer that is closer to the gap layer, and both side surfaces of the pole portion layer in the width direction.

2. A thin-film magnetic head according to claim 1, wherein the first magnetic layer is disposed on a trailing side in the traveling direction of the recording medium, and the second magnetic layer is disposed on a leading side in the traveling direction of the recording medium.

3. A thin-film magnetic head according to claim 1, wherein the yoke portion layer includes: a first layer that is in contact with and magnetically connected to the first magnetic layer and the surface of the pole portion layer closer to the gap layer; and a second layer that is in contact with and magnetically connected to the first layer and both the side surfaces of the pole portion layer in the width direction.

4. A thin-film magnetic head according to claim 3, wherein the second layer of the yoke portion layer is further magnetically connected to a surface of the pole portion layer that is farther from the gap layer.

5. A thin-film magnetic head according to claim 1, wherein the yoke portion layer is magnetically connected to the pole portion layer further at an end surface of the pole portion layer that is farther from the medium facing surface.

6. A thin-film magnetic head according to claim 5, wherein the yoke portion layer includes: a first layer that is in contact with and magnetically connected to the first magnetic layer and the surface of the pole portion layer that is closer to the gap layer; and a second layer that is in contact with and magnetically connected to the first layer, the end surface of the pole portion layer that is farther from the medium facing surface, and both the side surfaces of the pole portion layer in the width direction.

7. A thin-film magnetic head according to claim 6, wherein the second layer of the yoke portion layer is further magnetically connected to a surface of the pole portion layer that is further from the gap layer.

8. A thin-film magnetic head according to claim 1, wherein an end of the yoke portion layer that is closer to the medium facing surface is disposed at a distance from the medium facing surface.

9. A thin-film magnetic head according to claim 1, wherein a portion of the pole portion layer that is in contact with the yoke portion layer has a width greater than the width of the pole portion layer measured in the medium facing surface.

10. A thin-film magnetic head according to claim 1, wherein an end surface of the pole portion layer that is farther from the medium facing surface is located at a distance of 2 $\mu$m or more from the medium facing surface.

11. A thin-film magnetic head according to claim 1, further comprising a non-magnetic layer that is in contact with a surface of the pole portion layer that is farther from the gap layer.

12. A thin-film magnetic head according to claim 11, wherein the non-magnetic layer is exposed in the medium facing surface.

13. A thin-film magnetic head according to claim 11, wherein part of the yoke portion layer is adjacent to the surface of the pole portion layer farther from the gap layer via the non-magnetic layer, and is magnetically connected to the pole portion layer via the non-magnetic layer.

14. A thin-film magnetic head according to claim 11, wherein the non-magnetic layer is made of a material having a lower etching rate for dry etching than that of a material forming the pole portion layer, and than that of a material forming a portion of the gap layer, the portion being in contact with the pole portion layer.

15. A thin-film magnetic head according to claim 1, wherein the at least part of the thin-film coil is located closer to the first magnetic layer than a midpoint between the first magnetic layer and the pole portion layer of the second magnetic layer.

16. A thin-film magnetic head according to claim 1, wherein the gap layer comprises: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface.

17. A thin-film magnetic head according to claim 16, wherein the first portion is made of an organic, non-conductive and non-magnetic material, or a spin-on-glass film.

18. A thin-film magnetic head according to claim 16, wherein the second portion is made of an inorganic, non-conductive and non-magnetic material.

19. A thin-film magnetic head according to claim 1, further comprising a magnetoresistive element as a read element.

20. A thin-film magnetic head according to claim 19, further comprising a first shield layer and a second shield layer for shielding the magnetoresistive element, the first and second shield layers having portions that are located on a side of the medium facing surface and opposed to each other, the magnetoresistive element being located between these portions.

21. A thin-film magnetic head according to claim 20, wherein the first magnetic layer serves also as the second shield layer.

22. A thin-film magnetic head according to claim 1, being employed for a vertical magnetic recording scheme.

23. A method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein: the second magnetic layer has a pole portion layer including the magnetic pole portion, the width of the pole portion layer measured in the medium facing surface defining a track width, and a yoke portion layer for magnetically connecting the pole portion layer and the first magnetic layer to each other; and the pole portion layer has a saturated magnetic flux density equal to or greater than that of the yoke portion layer, the method comprising the steps of:

forming the first magnetic layer; and forming the gap layer, the thin-film coil and the second magnetic layer on the first magnetic layer, such that the at least part of the thin-film coil has a first surface closer to the first magnetic layer and a second surface opposite to the first surface, the second surface being located at a level closer to the first magnetic layer than a level of an end of the gap layer is, the end being located in the medium facing surface next to the second magnetic layer, and such that the yoke portion layer is magnetically connected to the pole portion layer at least at a surface of the pole portion layer that is closer to the gap layer, and both side surfaces of the pole portion layer in the width direction.

24. A method of manufacturing a thin-film magnetic head according to claim 23, wherein the yoke portion layer is magnetically connected to the pole portion layer further at an end surface of the pole portion layer that is farther from the medium facing surface.

25. A method of manufacturing a thin-film magnetic head according to claim 23, wherein the yoke portion layer includes: a first layer that is in contact with and magnetically connected to the first magnetic layer and the surface of the pole portion layer that is closer to the gap layer; and a second layer that is in contact with and magnetically connected to the first layer and both the side surfaces of the pole portion layer in the width direction, and wherein the step of forming the gap layer, the thin-film coil and the second magnetic layer includes the steps of:

forming the thin-film coil and one part of the gap layer on the first magnetic layer, the one part of the gap layer insulating the thin-film coil from its surrounding;

forming the first layer of the yoke portion layer on the first magnetic layer and the one part of the gap layer;

forming other part of the gap layer on the first magnetic layer, the one part of the gap layer and the first layer;

polishing the other part of the gap layer to expose the first layer and flattening top surfaces of the first layer and the other part of the gap layer;

forming a layer to be etched, the layer being made of a material for forming the pole portion layer, on the first layer and the other part of the gap layer that have been flattened;

etching the layer to be etched selectively by dry etching, thereby defining an outer shape of the pole portion layer that is in contact with the first layer and exposing the first layer; and forming the second layer of the yoke portion layer on the first layer.

26. A method of manufacturing a thin-film magnetic head according to claim 25, wherein the second layer of the yoke portion layer is further in contact with and magnetically connected to an end surface of the pole portion layer that is farther from the medium facing surface.

27. A method of manufacturing a thin-film magnetic head according to claim 25, wherein the step of forming the gap layer, the thin-film coil and the second magnetic layer further includes, after the step of forming the layer to be etched, the step of flattening a top surface of the layer to be etched, by polishing.

28. A method of manufacturing a thin-film magnetic head according to claim 25, wherein the step of forming the gap layer, the thin-film coil and the second magnetic layer further includes, after the step of forming the layer to be etched, the steps of: forming a non-magnetic layer on the layer to be etched; and forming a mask corresponding to the shape of the pole portion layer, on the non-magnetic layer, wherein:

in the step of etching the layer to be etched, the non-magnetic layer and the layer to be etched are etched through the use of the mask.

29. A method of manufacturing a thin-film magnetic head according to claim 28, wherein:

in the step of forming the mask, a resist frame having a gap portion corresponding to the shape of the pole portion layer is formed on the non-magnetic layer, and the mask is formed inside the gap portion of the resist frame.

30. A method of manufacturing a thin-film magnetic head according to claim 25, wherein the second layer of the yoke portion layer is formed by electroplating.

31. A method of manufacturing a thin-film magnetic head according to claim 30, wherein the step of forming the second layer of the yoke portion layer includes the steps of: forming a resist cover for covering a part of the pole portion layer located near the medium facing surface; forming an electrode layer for electroplating on the resist cover, the pole portion layer and the first layer of the yoke portion layer; and forming the second layer of the yoke portion layer by electroplating using the electrode layer.

32. A thin-film magnetic head comprising:

a medium facing surface that faces toward a recording medium;

a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium;

a gap layer made of a non-magnetic material and provided between the first and second magnetic layers; and a thin-film coil at least a part of which is disposed between the first and second magnetic layers and insulated from the first and second magnetic layers, wherein:

the at least part of the thin-film coil has a first surface closer to the first magnetic layer and a second surface opposite to the first surface, the second surface being located at a level closer to the first magnetic layer than a level of an end of the gap layer is, the end being located in the medium facing surface next to the second magnetic layer;

the second magnetic layer has: a pole portion layer including the magnetic pole portion, the width of the pole portion layer measured in the medium facing surface defining a track width; and a yoke portion layer for magnetically connecting the pole portion layer and the first magnetic layer to each other;

the pole portion layer has a saturated magnetic flux density equal to or greater than that of the yoke portion layer;

the yoke portion layer is magnetically connected to the pole portion layer at least at a surface of the pole portion layer that is closer to the gap layer; and a portion where the yoke portion layer and the pole portion layer are connected to each other is located closer to the medium facing surface than a portion where the first magnetic layer and the yoke portion layer are connected to each other.

33. A thin-film magnetic head according to claim 32, wherein, of a surface of the yoke portion layer farther from the first magnetic layer, a portion that is not in contact with the pole portion layer is located closer to the first magnetic layer than a surface of the pole portion layer closer to the gap layer.

34. A thin-film magnetic head according to claim 32, wherein at least part of the surface of the yoke portion layer farther from the first magnetic layer gradually approaches the first magnetic layer as the distance from the pole portion layer increases.

35. A thin-film magnetic head according to claim 32, wherein the first magnetic layer is disposed on a trailing side in the traveling direction of the recording medium, and the second magnetic layer is disposed on a leading side in the traveling direction of the recording medium.

36. A thin-film magnetic head according to claim 32, wherein an end of the yoke portion layer that is closer to the medium facing surface is disposed at a distance from the medium facing surface.

37. A thin-film magnetic head according to claim 32, wherein a portion of the pole portion layer that is in contact with the yoke portion layer has a width greater than the width of the pole portion layer measured in the medium facing surface.

38. A thin-film magnetic head according to claim 32, wherein an end surface of the pole portion layer that is farther from the medium facing surface is located at a distance of 2 µm or more from the medium facing surface.

39. A thin-film magnetic head according to claim 32, further comprising a non-magnetic layer that is in contact with a surface of the pole portion layer that is farther from the gap layer.

40. A thin-film magnetic head according to claim 39, wherein the non-magnetic layer is exposed in the medium facing surface.

41. A thin-film magnetic head according to claim 32, wherein the non-magnetic layer is made of a material having a lower etching rate for dry etching than that of a material forming the pole portion layer, and than that of a material forming a portion of the gap layer, the portion being in contact with the pole portion layer.

42. A thin-film magnetic head according to claim 32, wherein the at least part of the thin-film coil is located closer to the first magnetic layer than a midpoint between the first magnetic layer and the pole portion layer of the second magnetic layer.

43. A thin-film magnetic head according to claim 32, wherein the gap layer comprises: a first portion that is made of a material exhibiting fluidity during its formation, filled at least in between windings of the at least part of the thin-film coil, and not exposed in the medium facing surface; and a second portion that is made of a material having a better resistance to corrosion, rigidity and insulation property than those of the first portion, and exposed in the medium facing surface.

44. A thin-film magnetic head according to claim 43, wherein the first portion is made of an organic, non-conductive and non-magnetic material, or a spin-on-glass film.

45. A thin-film magnetic head according to claim 43, wherein the second portion is made of an inorganic, non-conductive and non-magnetic material.

46. A thin-film magnetic head according to claim 32, further comprising a magnetoresistive element as a read element.

47. A thin-film magnetic head according to claim 46, further comprising a first shield layer and a second shield layer for shielding the magnetoresistive element, the first and second shield layers having portions that are located on a side of the medium facing surface and opposed to each other, the magnetoresistive element being located between these portions.

48. A thin-film magnetic head according to claim 47, wherein the first magnetic layer serves also as the second shield layer.

49. A thin-film magnetic head according to claim 32, being employed for a vertical magnetic recording scheme.

50. A method of manufacturing a thin-film magnetic head comprising: a medium facing surface that faces toward a recording medium; a first magnetic layer and a second magnetic layer that are magnetically coupled to each other at a distance from the medium facing surface, and include magnetic pole portions disposed so as to oppose to each other with a predetermined spacing interposed therebetween along the traveling direction of the recording medium; a gap layer made of a non-magnetic material and provided between the first and second magnetic layers; and a thin-film coil at least a part of which is disposed between the first and second magnetic layers and insulated from the first and second magnetic layers, wherein: the second magnetic layer has a pole portion layer including the magnetic pole portion, the width of the pole portion layer measured in the medium facing surface defining a track width, and a yoke portion layer for magnetically connecting the pole portion layer and the first magnetic layer to each other; and the pole portion layer has a saturated magnetic flux density equal to or greater than that of the yoke portion layer, the method comprising the steps of:

forming the first magnetic layer; and forming the gap layer, the thin-film coil and the second magnetic layer on the first magnetic layer, such that the at least part of the thin-film coil has a first surface closer to the first magnetic layer and a second surface opposite to the first surface, the second surface being located at a level closer to the first magnetic layer than a level of an end of the gap layer is, the end being located in the medium facing surface next to the second magnetic layer, and such that the yoke portion layer is magnetically connected to the pole portion layer at least at a surface of the pole portion layer that is closer to the gap layer, and that a portion where the yoke portion layer and the pole portion layer are connected to each other is located closer to the medium facing surface than a portion where the first magnetic layer and the yoke portion layer are connected to each other.

51. A method of manufacturing a thin-film magnetic head according to claim 50, wherein the step of forming the gap layer, the thin-film coil and the second magnetic layer includes the steps of:

forming the thin-film coil and one part of the gap layer on the first magnetic layer, the one part of the gap layer insulating the thin-film coil from its surrounding;

forming the yoke portion layer on the first magnetic layer and the one part of the gap layer;

forming other part of the gap layer on the first magnetic layer, the one part of the gap layer and the yoke portion layer;

polishing the other part of the gap layer to expose the yoke portion layer and flattening top surfaces of the yoke portion layer and the other part of the gap layer;

forming a layer to be etched, the layer being made of a material for forming the pole portion layer, on the yoke portion layer and the other part of the gap layer that have been flattened; and etching the layer to be etched selectively by dry etching, thereby defining an outer shape of the pole portion layer that is in contact with the yoke portion layer and exposing the yoke portion layer, thereby forming a surface of the yoke portion layer that is farther from the gap layer.

52. A method of manufacturing a thin-film magnetic head according to claim 51, wherein the step of forming the gap layer, the thin-film coil and the second magnetic layer further includes, after the step of forming the layer to be etched, the step of flattening a top surface of the layer to be etched, by polishing.

53. A method of manufacturing a thin-film magnetic head according to claim 51, wherein the step of forming the gap layer, the thin-film coil and the second magnetic layer further includes, after the step of forming the layer to be etched, the steps of: forming a non-magnetic layer on the layer to be etched; and forming a mask corresponding to the shape of the pole portion layer, on the non-magnetic layer, wherein:

in the step of etching the layer to be etched, the non-magnetic layer and the layer to be etched are etched through the use of the mask.

54. A method of manufacturing a thin-film magnetic head according to claim 53, wherein:

in the step of forming the mask, a resist frame having a gap portion corresponding to the shape of the pole portion layer is formed on the non-magnetic layer, and the mask is formed inside the gap portion of the resist frame.

* * * * *